US011694440B2

(12) United States Patent
Jindal et al.

(10) Patent No.: US 11,694,440 B2
(45) Date of Patent: *Jul. 4, 2023

(54) IMAGE PROCESSING TECHNIQUES TO QUICKLY FIND A DESIRED OBJECT AMONG OTHER OBJECTS FROM A CAPTURED VIDEO SCENE

(71) Applicant: Adobe Inc., San Jose, CA (US)

(72) Inventors: Amol Jindal, San Jose, CA (US); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,897

(22) Filed: Jul. 12, 2022

(65) Prior Publication Data

US 2022/0343647 A1 Oct. 27, 2022

Related U.S. Application Data

(63) Continuation of application No. 17/177,761, filed on Feb. 17, 2021, now Pat. No. 11,398,089.

(51) Int. Cl.
| G06V 20/00 | (2022.01) |
| G06V 20/20 | (2022.01) |
| G06F 16/532 | (2019.01) |
| G06V 10/46 | (2022.01) |
| G06V 10/75 | (2022.01) |
| G06V 30/10 | (2022.01) |
| G06F 18/2413 | (2023.01) |
| G06Q 30/0601 | (2023.01) |

(52) U.S. Cl.
CPC ........... *G06V 20/20* (2022.01); *G06F 16/532* (2019.01); *G06F 18/24147* (2023.01); *G06V 10/462* (2022.01); *G06V 10/751* (2022.01); *G06V 30/10* (2022.01); *G06Q 30/0625* (2013.01)

(58) Field of Classification Search
None
See application file for complete search history.

(56) References Cited

U.S. PATENT DOCUMENTS

| 10,607,115 | B1 * | 3/2020 | Pintsov | ............ G06V 30/19147 |
| 10,706,092 | B1 * | 7/2020 | Morriss | ............... G06F 16/9538 |
| 11,037,348 | B2 * | 6/2021 | Shi | ........................ G06N 3/0454 |
| 2011/0083101 | A1 * | 4/2011 | Sharon | .................. H04W 4/029 |
| | | | | 709/204 |

(Continued)

*Primary Examiner* — Martin Mushambo
(74) *Attorney, Agent, or Firm* — Finch & Maloney PLLC

(57) ABSTRACT

Techniques are provided for identifying objects (such as products within a physical store) within a captured video scene and indicating which of object in the captured scene matches a desired object requested by a user. The matching object is then displayed in an accentuated manner to the user in real-time (via augmented reality). Object identification is carried out via a multimodal methodology. Objects within the captured video scene are identified using a neural network trained to identify different types of objects. The identified objects can then be compared against a database of pre-stored images of the desired product to determine if a close match is found. Additionally, text on the identified objects is analyzed and compared to the text of the desired object. Based on either or both identification methods, the desired object is indicated to the user on their display, via an augmented reality graphic.

20 Claims, 9 Drawing Sheets

(56) References Cited

U.S. PATENT DOCUMENTS

| | | | | |
|---|---|---|---|---|
| 2014/0233798 A1* | 8/2014 | Cho | ......................... | G06T 7/246 |
| | | | | 382/103 |
| 2019/0089898 A1* | 3/2019 | Kim | ....................... | H04N 5/247 |
| 2019/0373186 A1* | 12/2019 | Ortiz Egea | ........... | G06V 10/454 |
| 2020/0285953 A1* | 9/2020 | Samples | ................. | G06V 20/40 |
| 2020/0327343 A1* | 10/2020 | Lund | ....................... | H04W 4/46 |
| 2021/0012091 A1* | 1/2021 | Liu | ......................... | G06F 21/32 |

\* cited by examiner

IMAGE PROCESSING TECHNIQUES TO QUICKLY FIND A DESIRED OBJECT AMONG OTHER OBJECTS FROM A CAPTURED VIDEO SCENE

CROSS-REFERENCE TO RELATED APPLICATIONS

This application is a continuation of U.S. patent application Ser. No. 17/177,761 (filed 17 Feb. 2021), the entire disclosure of which is hereby incorporated by reference herein.

FIELD OF THE DISCLOSURE

This disclosure relates generally to image processing, and more particularly, to image processing techniques for quickly finding a desired object among other objects from a captured video scene.

BACKGROUND

Image processing techniques can be used to detect the presence of particular objects in the image. For example, an image processing system may include a neural network trained to identify a cat within a given image. However, there remain a number of non-trivial issues with respect to object detection within images, and existing object detection techniques will fail in many practical scenarios. For instance, consider the example case of a grocery store shelf where a target object to be identified is a particular product such as a can of soup, but the can is surrounded by many other cans of soup that look similar. Current image-based object identification techniques cannot discern the target can of soup from the surrounding similar looking cans of soup, or otherwise identify the target can of soup among the plurality of similar looking cans of soup. This is because current object detection techniques use broader classes in training which means they will label the cans generally as food cans only, rather than more specific labels such as cans of chicken noodle soup. Thus, all the different flavored cans of soup will be identified as the same object (e.g., food can). Furthermore, there are numerous orientations in which the cans may be placed on the shelves. For instance, while some cans depicted in a given image may be oriented so as to allow for full can view, other cans may be oriented or occluded to show only partial can view. In the latter case, current objection detection techniques will not be able to find enough features to confidently classify the partially imaged cans in corresponding labels. Therefore, for at least these reasons, complex and non-trivial technical issues with image-based object identification remain.

SUMMARY

Techniques are provided herein for identifying various objects within a captured video scene and indicating which of the objects in the captured scene matches a given desired object (requested by a user). Although the techniques can be used to find any number of objects, they are particularly useful in the context of finding a specific product that a user is searching for on a given product display that also includes other similar looking products. As will be appreciated, the product can be any number of products, but one specific such example case is where the specific product desired by the user is a can of chicken noodle soup, and the objects to be identified are soup cans stocked on a grocery store shelving unit that includes cans of chicken noodle soup as well as many other types of canned soup (such as a typical Campbell's soup display). In any case, the objects within the captured video scene are identified using a multimodal approach that includes both object detection and textual analysis, as will be explained in turn. Once the target object is identified within the captured video scene, that target object is highlighted within the displayed video, in an augmented reality fashion. The user can thus use that augmented display to locate the target object on the shelving unit.

In an example use case, the techniques may be embodied in a mobile application ("app") executing on, or otherwise accessible to, a user's smartphone, tablet, or other portable computing device configured with a camera (assume smartphone for purposes of example). The mobile app may be installed directly on the smartphone, or served to the smartphone via a client-server or cloud-based arrangement. The mobile app can be provided, for example, to customers of a store that sells products (e.g., a grocery store chain that sells groceries). So, with reference to the grocery store and soup can example, the user may launch the mobile app in the soup can isle at the grocery store and speak or type the name of a desired grocery store product (e.g., Campbell's chicken noodle soup) into their smartphone, and capture video of the soup can shelves. The mobile app causes the soup cans within the captured video scene to be identified using a multimodal approach that includes both object detection and textual analysis. In any case, the Campbell's chicken noodle soup can (or other product/object on the shelves that matches the target product/object requested by the user) is displayed in an accentuated fashion to the user in real-time by way of augmented reality (AR).

This AR-based presentation of the target product/object is accomplished, for example, by showing on a display of the user both (1) the live captured video and (2) a graphical indication of which product/object in the captured video is the desired product/object. The display may be part of the user's smartphone or other type of portable computing device, or an accessory display that is communicatively coupled to that device (such as AR glasses or goggles, or an AR helmet and display assembly). The graphical indication can be, for instance, an overlay that masks out all products in the displayed scene except for the desired product/object, such that the desired product/object is effectively framed and thus accentuated in the AR environment, thereby facilitating rapid location of the desired product/object in the real-world. In some embodiments, this graphical indication can be supplemented with additional feedback to help the user identify when the target product/object is being imaged, such as a haptic response (e.g., vibration of smartphone) or a beeping. Thus, the AR-based feedback may include any combination of visual, tactile, or aural indicators.

As noted above, the object identification is carried out using different techniques to increase the confidence of correct identification. In this manner, the techniques provide a multimodal approach to object identification, wherein image content analysis is used to detect salient visual features of the object depicted in the imagery, and textual analysis is used to detect textual features of that object. In particular, different objects within the captured video scene are identified using a neural network trained to identify and apply one or more classification labels to different types of objects. More specifically, the neural network includes one or more object identification layers arranged during supervised training of the neural network to identify various objects from an image, such as objects that would be sold or advertised in a given store (e.g., food cans of a grocery store). In some such embodiments, a scale and rotation invariant technique is used to determine salient features of the identified objects, which are then compared against a database of pre-stored images of the desired product using a K-nearest matching technique to determine if a close match of enough features is found. In the context of the grocery store example, the database could include images of all the grocery store products sold by that store; in the context of a user's home example, the database could include images of all the grocery store products included in the user's pantry. In addition to this salient feature detection, text on the identified objects is extracted and analyzed using a text identification technique, such as optical character recognition (OCR). The extracted text is compared to the text of the desired object provided by the user. Based on either or both identification methods, the desired object is indicated to the user via the graphical indication on their display. Supplementing the salient feature detection of the identified objects with textual extraction and analysis of the identified objects, in the context of an AR-based mobile application, yields a robust object identification system. Although many of the examples herein may refer to the identification of products (such as products on a grocery store shelf or kitchen pantry shelf), the techniques are not limited to such examples and could be used to graphically accentuate or otherwise identify any object within a given captured video scene. Numerous variations and embodiments of the disclosed techniques will be appreciated in light of this disclosure.

As will be further appreciated, example use cases provided herein are in the context of scenes captured by live video, but the techniques disclosed can readily be applied to still images as well. For instance, instead of capturing the soup can shelves with video, the user could just snap a picture of the soup can shelves. In still other cases, a single frame of video could be used. In any case, the picture or a single frame of video capturing the soup can shelves can be displayed, and that displayed picture or a single frame of video could be augmented to highlight the target can of soup (e.g., like the displayed video is augmented). Note that in some such cases, where the displayed scene is a still image, that the displayed scene is not a live scene per se, which is fine according to such embodiments. Numerous embodiments will be apparent in light of this disclosure.

While some embodiments are described herein with respect to mobile apps, the present disclosure is not intended to be limited to mobile apps. Rather, any number of non-transitory machine-readable mediums (e.g., embedded memory, on-chip memory, read only memory, random access memory, solid state drives, and any other physical storage mediums) can be used to encode instructions that, when executed by one or more processors, cause an embodiment of the techniques provided herein to be carried out, thereby allowing for the rapid identification and discernment of objects within a captured video scene to highlight the physical location of a desired object requested by a user. Likewise, the techniques can be implemented in hardware (e.g., logic circuits such as field programmable gate array, purpose-built semiconductor, microcontroller with a number of input/output ports and embedded routines).

DETAILED DESCRIPTION

Figure 1:
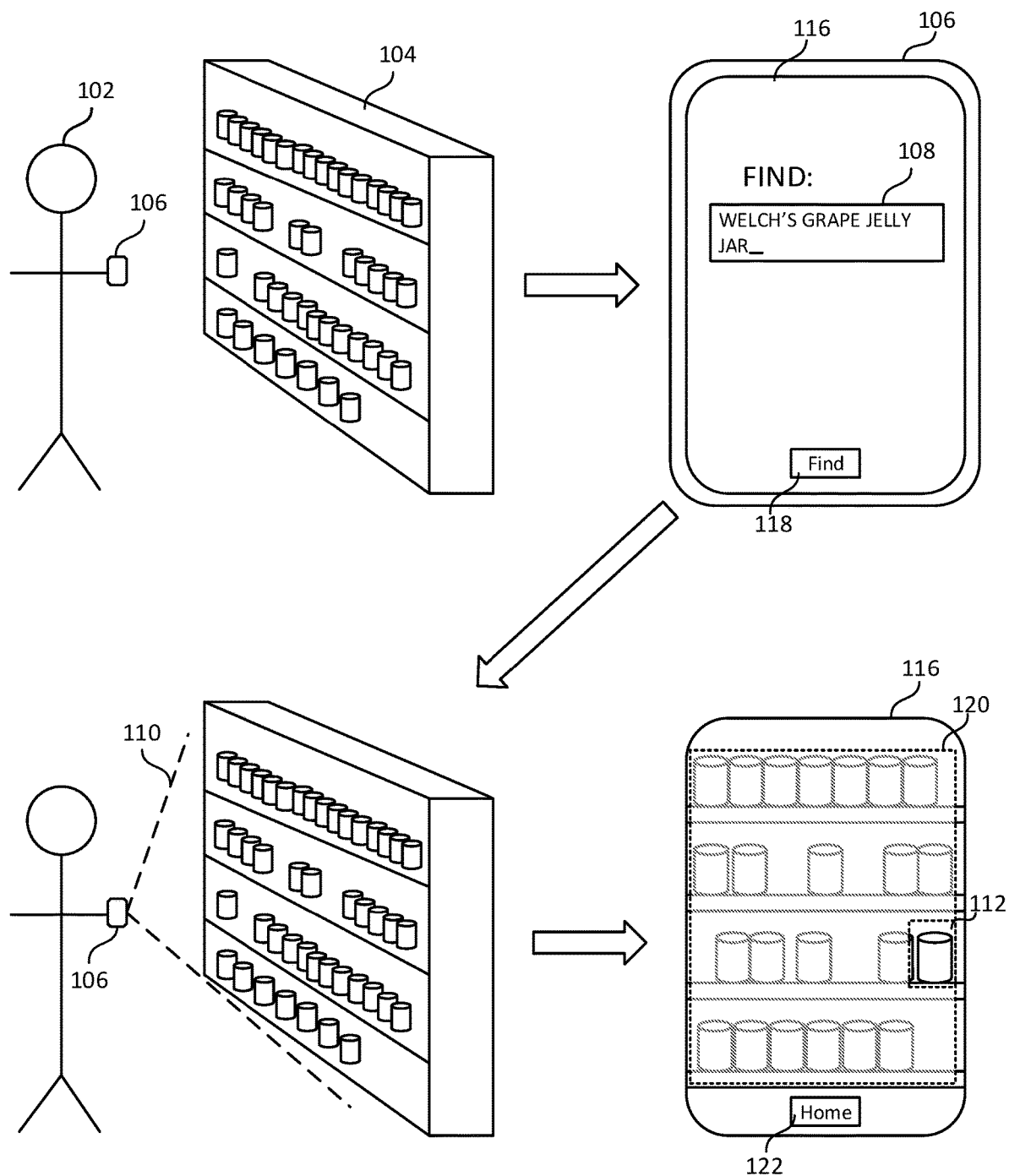
FIG. 1 shows an example use case for a mobile computing device that includes an object locator system, the object locator system programmed or otherwise configured to identify in real-time via an augmented reality graphic a target object that is among a plurality of other objects captured within a displayed video scene, in accordance with an embodiment of the present disclosure.

Techniques are provided herein for graphically identifying a target object sitting amongst other objects in a captured scene (e.g., captured video or image). This problem is complex due to how similar the objects may be to one another, and due to various orientations that a given object may be in. For example, when looking for a particular can of soup at the grocery store, the can of soup is likely sitting on a shelf surrounded by many other cans of similar size and shape and color scheme. Furthermore, the desired can of soup may be rotated at an orientation that makes it harder to confidently see or otherwise discern the text on the can of soup. Accordingly, a human can have difficulty locating a desired can quickly, and object detection techniques fail to correctly identify the desired can of soup in this situation because such techniques will see all cans as the same object (e.g., food can), as previously explained. In order to address this problem, and in accordance with an embodiment of the present disclosure, a multimode approach is taken wherein both (1) salient visual features of the target object (e.g., size, shape and/or color scheme) and (2) textual information on the given objects, as obtained from the captured scene, are used to correctly identify the target object amongst other objects, even if the other objects share many visual similarities with the target object. In addition, once the target object is identified, augmented reality (AR) operations are performed to graphically highlight that target object in a display of the captured scene. The user can then use that target object location information learned from the AR environment to rapidly locate the object in the real-world. Numerous variations and embodiments will be appreciated in light of this disclosure.

As indicated above, the techniques are multimodal in that they separately analyze visual information and textual information captured from the imaged scene. The visual information can be analyzed using image feature analysis and the textual information can be analyzed using text extraction and analysis. Once such visual and textual information is extracted from the imaged scene, it can then be compared to the visual and textual information of known (e.g., labelled) reference images that correspond to the target object for which the user is searching, to see if there is a match. So, once the user provides the name of the target object, the corresponding reference images can be retrieved or otherwise accessed for use in identifying the target object among a plurality of objects in the imaged scene.

In more detail, and according to an embodiment, a plurality of images for different objects (e.g., images of various products commonly sold in grocery stores) are stored in a database. Many images may be associated with a single object. For example, images at different angles or in different lighting conditions may be provided and tagged as being associated with a given object. According to some embodiments, salient features (e.g., size, shape, color scheme, etc.) of the object within each of the stored images are determined using feature detection routines, such as scale-invariant feature transform (SIFT), speeded up robust features (SURF), or an oriented FAST and rotated BRIEF (ORB) feature detector. Note that FAST (features from accelerated segment test) is a feature detector, and BRIEF (binary robust independent elementary features) refers to a binary descriptor such as a vector. Further note that such product cataloguing and feature detection can be done offline or otherwise in advance of a user's shopping experience. In any case, and according to some embodiments, once a user is in the store or location of interest, the user can launch or otherwise engage a product locator system (e.g., on their smartphone), in accordance with an embodiment of the present disclosure.

At the home screen of the product locator system, the user can enter the name of a target object via voice or text input, and can engage the smartphone's camera to cause the capture and display of the scene in front of the user. In some such embodiments, note that the user's entry of a target object can be used to automatically launch the smartphone's camera, so as to provide a live display of the scene in front of the user. Once the user provides the target object, the one or more images in the database that correspond to the target object can be accessed along with their associated salient features. In this manner, the salient features of the target object are known. The captured scene is provided as an input to a neural network trained to identify and classify the objects present in the captured scene. The neural network outputs bounding box locations around each of the identified objects along with one or more classifications for each of the objects. Salient features are determined from each of the identified objects in the captured scene and compared to the salient features of the objects in the stored images that correspond to the target object, to determine if there is a match for the target object. Additionally, and in some examples simultaneously with the comparing of salient features, textual information on the identified objects in the captured scene is compared to the text of the target object (as provided by the user) to determine if there is a match. Based on the matching results determined from either or both the feature detection and the textual matching, the target object is identified on the user's display. In particular, the display of the scene being viewed by the user can be augmented to show the target object highlighted or otherwise graphically indicated on the display. In this manner, the user has access to an augmented reality (AR) application that can be used to assist the user in rapidly finding the target object in the real-world.

Term Definition

As used herein, the terms "augmented reality" and "AR" refer to the addition of one or more digital elements to a displayed scene captured, for instance, by the camera of a smartphone or other portable computing device. The one or more digital elements can be used, for example, to accentuate a physical object captured in the live view display. For instance, according to an embodiment of the present disclosure, a target object in the real-world can be captured in a video and displayed in an accentuated fashion to the user in real-time by showing the live view on a display along with a graphical indication of which object in the captured video is the desired object. The display may be, for example, part of the user's portable computing device, or an accessory display that is communicatively coupled to that device (such as AR glasses or goggles, or an AR helmet and display assembly). The graphical indication can be, for instance, an overlay that grays or otherwise masks out all objects in the displayed scene except for the desired object, such that the desired object is effectively framed and thus accentuated in the AR environment, thereby facilitating the user's rapid location of the desired object in the real-world. In some cases, the graphical indication may flash on and off to further assist the user in identifying the target object. In some cases, the graphical indication can be supplemented with additional feedback, such as a haptic response or a beeping. Thus, the AR-based feedback may include any combination of visual, tactile, or aural indicators.

As used herein, the terms "target object" or "desired object" refer to any object that a user is trying to find, such as a product on a store shelf. The user inputs the name of the target object into a mobile computing device and looks to a display on the mobile computing device to see the target object graphically identified from a live video capture from in front of the mobile computing device.

As used herein, the term "image database" represents any physical storage medium that includes a plurality of different object images, each image classified or otherwise associated with an object label. Each object represented in the database may be associated with one or more images. The database may be a database for a specific store, or more generally a database that includes objects typically found or otherwise sold in a given store, whether a grocery store, electronics store, hardware store, pharmacy, office supply store, wine/liquor store, department store, or any other store that sells products in a physical store where it may be difficult for a shopper to find a given one of those products in a given display of products. According to some example embodiments provided herein, any such store may provide a given user (shopper) an enhanced in-store shopping experience by leveraging a database of all the products sold by the store (any e-commerce platform having a physical store that is patronized by customers), where for each product sold in the store the database contains a corresponding object label and that object's corresponding one or more object images in one or more orientations and/or in various packages (if applicable).

As used herein, the term "textual content" represents text in any style or font written on an object and identified using any text recognition system, such as optical character recognition (OCR).

As used herein, the term "label vector" refers to any list of one or more classification labels or terms provided via a classification process to an identified object or a stored object image, and that describe one or more characteristics of the object. For example, if a given object is "grape jelly", the label vector may include classification labels such as "jar", "purple", "jelly" to characterize how the object looks. Likewise, the label vector for a "brown wallet" may include the classification labels "brown", "wallet", "purse", "bag" to characterize how the object looks. The classification labels of one object may be readily compared to the classification labels associated with another object to determine if there is a possible match. The classification process may be, for example, carried out via a deep learning model, as will be explained in turn.

General Overview

As noted above, quickly locating a target object from a live scene is complex due to object similarity (especially with products in stores), and due to various orientations that a given object may be in. Accordingly, existing image processing techniques may fail to correctly identify specific objects if there are too many similar objects around and/or if the object is oriented at an unexpected angle. In other words, such image processing techniques are one-dimensional in that they only use one object identification technique that is prone to errors. In order to address this problem, and in accordance with an embodiment herein, both specific visual features and text on the target object are used to identify the target object amongst other objects, even if the other objects share many similarities with the target object. Once identified, the location of the target object can be accentuated on a display for the user. For example, augmented reality operations can be used to graphically identify the target object via highlighting or some other graphical notation on a live captured video or image of the scene that includes the target object. In some other examples, other portions of the live captured video or image except for the target object are masked or grayed out or otherwise diminished in appearance to emphasize the location of the target object to the user.

Providing a user the ability to identify objects from a live captured scene requires a solution that is both fast and adaptable to be able to identify newly added objects. Thus, and in accordance with some embodiments, an object locating technique discussed herein leverages a neural network for quick object detection, along with a combination of salient feature detection and text identification to quickly produce highly robust matches. Additionally, the feature comparison operations use pre-stored and labelled or otherwise pre-classified reference images from an object image database, which allows for new object images to be easily added to the database, according to some embodiments. Furthermore, the neural network can be trained in a supervised manner which allows for identification of new objects and can even be trained in an unsupervised manner to recognize new objects that are observed over and over again, as will be appreciated.

The techniques may be embodied in devices, systems, methods, or machine-readable mediums, as will be appreciated. For example, according to an embodiment of the present disclosure, a method is provided for locating a target object from a live video image. The method includes: receiving an object name associated with the target object via a user interface; capturing video of a scene that includes a plurality of objects; identifying objects within the scene using a neural network having one or more object classification layers; identifying one or more salient features of the identified objects; identifying textual content present on the identified objects; identifying the target object from the identified objects, using the one or more salient features and/or the identified textual content; and causing the target object to be highlighted on a display of the scene. In some example embodiments, the method includes: identifying one or more images associated with the target object from an image database; comparing the identified objects with any of the one or more images associated with the target object from the image database to determine if a match above a confidence threshold is found between any of the identified objects and any of the one or more images associated with the target object. In some example embodiments, the method includes comparing textual content identified on the identified objects with the object name to determine if a match is found between the textual content on any of the identified objects and the object name.

Numerous examples are described herein, and many others will be appreciated in light of this disclosure.

Example Use Scenario

FIG. 1 shows an example use case for a mobile computing device 106 that includes an object locator system 116 programmed or otherwise configured to identify in real-time via an augmented reality graphic a target object that is among a plurality of other objects captured within a displayed video scene, in accordance with an embodiment. As can be seen, a shopper 102 is in front of a variety of products on shelves 104 within a store. Thus, in this example, the object to be located is a product in the store. Variations will be apparent. For instance, in other cases, a user 102 is in front of a variety of products on shelves 104 within a pantry of the user's home. For purposes of this example embodiment, assume user 102 is a shopper in a grocery store and is looking for a jar of Welch's grape jelly. The arrows show the progression of actions that occur to ultimately identify the shopper's desired product.

Shopper 102 has a mobile computing device 106. According to some embodiments, portable computing device is a smartphone or tablet. In some examples, portable computing device is any computing device that includes at least one input mechanism to receive the name of a target object from shopper 102 (e.g., virtual keyboard or microphone), at least one input to capture a scene 110 (via video or still image) in front of shopper 102 (e.g., camera), and a display (e.g., the display of a smartphone, or augmented reality (AR) glasses communicatively coupled to a smartphone). For this example, assume computing device 106 is a smartphone having a display and camera, along with other standard smartphone componentry and functionality. As can be seen in this example, shelves 104 are packed with various products that look similar, making it difficult for shopper 102 to find what he/she is looking for. So, shopper 102 engages or otherwise accesses the object locator system 116 on smartphone 106. Object locator system 116 may be, for instance, a mobile app that is installed directly on smartphone 106, or served to smartphone 106 via a client-server or cloud-based arrangement. In some such cases, one or more functional aspects of object locator system 116 can be provided, for example, to customers of a store that sells products (e.g., a grocery store chain that sells groceries) via a wireless network accessible via smartphone 106 when shopper 102 is in the store. Numerous such mobile app configurations will be apparent in light of this disclosure.

Shopper 102 uses smartphone 106 to input that he/she is looking for a jar of Welch's grape jelly into a user interface of object locator system 116. In particular, the input is typed into a text field 108 of the user interface shown on a display of smartphone 106. In another embodiment, shopper 102 can speak the name of the product he/she is looking for and a microphone component of the smartphone 106 receives the voice audio. Any voice-to-text techniques can be used to translate the speech and identify the name of the product being spoken by shopper 102. As can further be seen, the user initiates the search for the Welch's grape jelly by clicking the find button 118 of the user interface. In some embodiments, object locator system 116 may be configured to interact with shopper 102, to further clarify the target object. For instance, if the object being looked for includes multiple packaging types, and the initial query by the user does not specify the desired packaging, then object locator system 116 may prompt shopper 102 to specify the packaging type with respect to the desired grape jelly. In one such case, for instance, a user interface screen can be presented to the user that includes a prompt and a set of selectable package types (e.g., jar or squeeze bottle). Shopper 102 can then select the desired packaging to complete the initial query. Numerous other user interface configurations will be appreciated in light of this disclosure.

According to some embodiments, in response to shopper 102 initiating the search for a jar of Welch's grape jelly by clicking find button 118, object locator system 116 automatically engages a camera component of smartphone 106 which in turn allows shopper 102 to capture scene 110. In other cases, shopper 102 can access the camera manually, after the search is initiated. In either such cases, shopper 102 may be prompted to capture video or an image of scene 110, after the search is initiated, according to some embodiments. In any such cases, and as can be seen the illustrated example, shopper 102 points smartphone 106 towards shelves 104 and captures either live video or a still image of shelves 104 along with all of the various products on shelves 104 within scene 110.

Once object locator system 116 has received or otherwise has access to the desired product (a jar of Welch's grape jelly) and the captured video or image of scene 110, object locator system 116 analyzes the objects of the captured scene and indicates the location of target product 112 in the live display of smartphone 106 by overlaying a graphical indication 120 on the displayed scene. As will be further discussed in turn, the analysis of the objects of the captured scene includes a multimodal approach. This multimodal approach includes an object classification process that leverages an image database of pre-classified objects to generally identify the objects of the captured scene, and further includes a textual analysis process to specifically identify the objects of the captured scene. The image database can be, for example, part of the store's product locator platform and accessible via the store's wireless local area network, and/or may be included in smartphone 106. In any case, the database is queried using the input provided at 108 by shopper 102, thereby identifying one or more labelled images of Welch's grape jelly products, including any known variations in packaging, such as jars and squeeze bottles. So, in the context of the given example, the object classification process generally identifies various jars of jelly on shelves 104 as food jars, for instance. In addition, the textual analysis process identifies textual content on the imaged food jars, such as words like: grape; jelly or jam; and branding language such as Welch's, Smucker's, and Stonewall Kitchen. Once a jar on shelf 104 that has text such as Welch's, grape, and jelly is identified, object locator system 116 further causes that jar to be highlighted within the display of smartphone 106.

In this example, the jar of Welch's grape jelly would be identified from amongst all of the other products within scene 110 on the display of smartphone 106. In some such embodiments, the display of smartphone 106 shows live video of scene 110 and target product 112 is highlighted or otherwise graphically identified via 120 within the live video scene (augmented reality). In other such embodiments, a still image of scene 110 is displayed along with target product 112 being highlighted or otherwise graphically identified via 120 within the still image of scene 110. The graphical identification 120 of target product 112 can take on any form, including highlighting, outlining, bolding, flashing, masking, and graying out non-target objects, to name a few examples. As can be seen in the specific example of FIG. 1, all other portions of the displayed scene 110 except for target product 112 are masked out via 120 (e.g., grayed out using a gray color filter) to identify or otherwise accentuate the location of target product 112. As previously explained, in some embodiments, graphical indication 120 can be supplemented with additional feedback to help the user identify when the target product/object is being imaged, such as a haptic response (e.g., vibration of smartphone) or a beeping. Thus, the AR-based feedback may include any combination of visual, tactile, or aural indicators.

Once shopper 102 has used the augmented presentation of objects on shelves 104 provided by object locator system 116 to find the desired product, shopper 102 can then click the home button 122 to return to the home screen (above right corner of FIG. 1), so another product search can be conducted if so desired. Shopper 102 can thus repeat the product location process as needed, while moving around the store.

System Architecture

Figure 2:
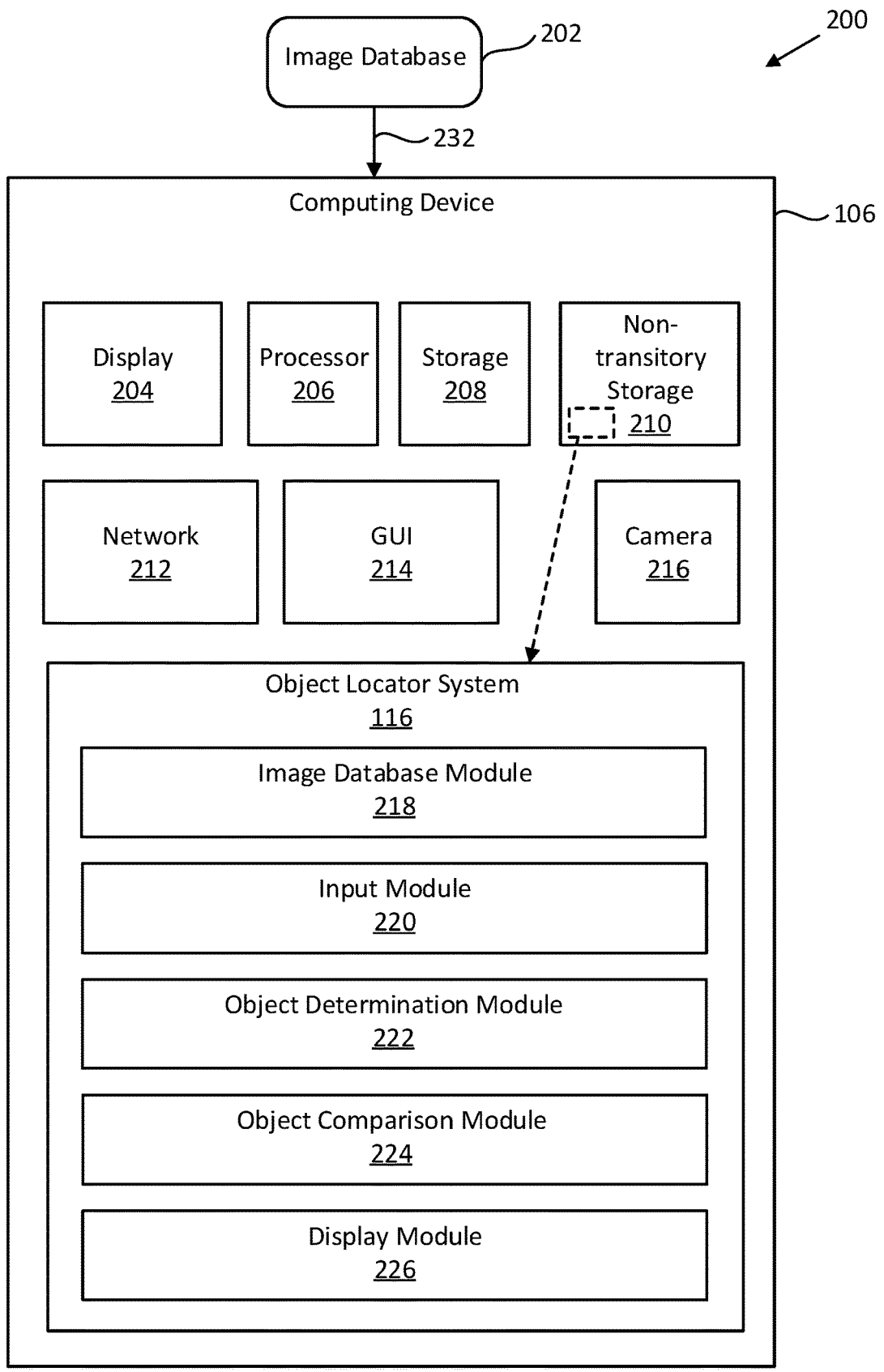
FIG. 2 shows an example system having an object locator system, in accordance with an embodiment of the present disclosure.

FIG. 2 shows an example system 200 that, among other things, implements an object locator system 116 to locate a target object from a live video image, according to an embodiment. As can be seen, the system 200 includes a computing device 106 and an image database 202 that are communicatively coupled by a network 232. As previously explained with respect to FIG. 1, computing device 106 can be, for example, any standard or proprietary mobile computing device (e.g., smartphone, tablet, AR-system or device, etc.), and includes a display 204, a processor 206, a storage 208, a non-transitory storage medium 210, a network interface 212, a graphical user interface (GUI) 214, and camera 216. As can be further seen, computing device 106 further includes object locator system 116, which in some examples is a mobile application that is stored in non-transitory storage medium 210 (as shown with dashed lines), or provided to device 116 via network 232.

Image database 202 can be, for instance, a server computer with which computing device 106 interacts in a client-server relationship via network 232, or an external repository (e.g., disc drive or network attached storage) that is accessible to computing device 106 via network 232. Network 232 can be any wired network (e.g., USB, Ethernet, etc.) or wireless network (e.g., 802.11, Wi-Fi, Bluetooth, etc.), or a combination of such. In some example cases where system 200 is a product locator system usable in the store of a given retailer (e.g., grocery store, etc.), database 202 includes one or more images for each of all the products sold by that retailer, and network 232 is a wireless network that is made available (with or without encryption) to customers of that retailer when they are in the store. In another example case where system 200 is a product locator system usable in the home of a given user, database 202 may include, for instance, one or more images for each of all the products in the user's food pantry, and network 232 is a wireless or wired network within the user's home. In either case, the images of database 202 are associated with one or more object labels or otherwise pre-classified with respect to objects depicted within those images.

Display 204 can be any display, such as a touch screen display of a smartphone or tablet, or the display of an AR-device or system (e.g., AR glasses or goggle, or an AR helmet with built-in display). In a more general sense, display 204 can be any display suitable for displaying content to the user of device 106, including content that is captured in the field of view of camera 216, as will be appreciated. In some example embodiments, camera 216 is capable of capturing live video that is displayed in real-time via display 204 (such as a smartphone can do). Variations will be apparent, including the case where camera 216 is capable of capturing still images of a given scene that is displayed via display 204.

Processor 206 can access and execute instructions or software stored in non-transitory computer-readable medium 210 and other programs for controlling system hardware and functionality of device 106. Processor 206 may have multiple cores to facilitate parallel processing or may be multiple single core processors. Any number of processor architectures can be used (e.g., central processing unit and co-processor, graphics processor, digital signal processor). In this example case, processor 206 is configured to execute the modules of object locator system 116, which include image database module 218, input module 220, object determination module 222, object comparison module 224, and display module 226. Each of these modules is described in further detail below.

Storage 208 is also accessible to processor 206 and can be used for storing any type of files and information on device 106, and may include any number of suitable memory technologies, such as RAM, ROM, Flash, a hard-drive or disc drive, or other machine-readable mediums. In some embodiments, computing device 106 is configured to receive or retrieve images of objects from image database 202 and/or from storage 208. Note that image database 202 may be local to device 106 (e.g., plug-and-play hard drive) or remote to device 106 (e.g., cloud-based storage). Further note that, if all images can be stored in storage 208, then database 202 may not be included, according to some embodiments. As will be appreciated, non-transitory computer-readable medium 210 can include similar types of memory (e.g., RAM, ROM, etc.), and in some cases includes memory that is on-board processor 206. As previously explained, non-transitory computer-readable medium 210 stores executable instructions or software for implementing various embodiments (such as instructions for an operating system as well as object locator system 116).

Network interface 212 can be any appropriate network chip or chipset which allows for wired or wireless connection between the computing device 106 and communication network 232 (such as a USB, Ethernet, or wireless local area network) and other computing devices and resources. GUI 214 may include, for instance, a touch-based user interface that leverages a touchscreen display 204 of computing device 106. In some such embodiments, the touch-based user interface may include a home screen and a search screen, as shown in FIG. 1 in the upper and lower right corners, respectively. Further note that device 106 may be, for example, a client in a client-server arrangement, wherein at least a portion of GUI 214 used for interacting with the object locator system 116 is served or otherwise made accessible to device 106 via network 232 (e.g., the Internet and a local area network that is communicatively coupled to the network interface 212). In a more general sense, any number of user interface techniques can be used, as will be appreciated.

Computing device 106 may include any number of other features not depicted in FIG. 2, such as input devices for receiving input from a user, or output devices for providing information to the user, such as a keyboard (virtual or real), a joystick or controller, a pointing device (e.g., a mouse, trackpad), voice input (microphone and voice-to-text process), or AR-based devices (e.g., glove, glasses, headset, helmet). In a more general sense, computing device 106 may include and/or otherwise have access to any number of input/output (I/O) peripherals to support a given application, as will be appreciated.

As will now be discussed, each of the modules 218, 220, 222, 224, and 226 are used in conjunction with each other to complete a process for locating a target object from a live video image, according to an embodiment of the present disclosure. Note that other embodiments may have fewer modules or more modules. For instance, all of the functionality described could be carried out in one single module, according to some embodiments. Likewise, the function attributed to one module in one embodiment may be carried out by another module in another embodiment. For instance, text extraction can be performed by module 222 in some embodiments and may be performed by module 224 in some other embodiments. Numerous such variations will be apparent. To this end, the degree of modularity or integration may vary from one embodiment to the next, and the example modules provided are not intended to limit the present disclosure to a specific structure.

According to some embodiments, image database module 218 is programmed or otherwise configured to perform functions related to the storage and categorization of images of various objects. For example, a grocery store may include a database 202 of images depicting all of the products offered for sale in the store (e.g., as imaged by the store clerk or service provider). In another example, a user's home may include a database 202 of images depicting all of the products in the user's pantry (e.g., as imaged by the user when purchased groceries are brought into the home). A given product may be associated with a plurality of stored images, so as to provide different angles of the given product or show the given object in different ambient light conditions or different packaging. Image database module 218 also identifies salient features within each of the images that can be used to later identify an object within the image and compare it to another image containing the same object. According to some example embodiments, a data structure for each object may be stored that tracks the images associated with each object and maps the locations of the salient features within each of the images. Further details of how the object images are stored with their object features identified are provided herein with reference to FIG. 5.

Although image database module 218 is illustrated as being included in and executed by computing device 106, in some embodiments, image database module 218 is executed in an offline fashion by a separate computing device (e.g., cloud-based server computer associated with database 202) so as to allow for populating database 202 with classified images in advance of a given shopper's in-store experience. For example, image database module 218 may be executed by a server system or any other remote computing system to store and/or categorize the plurality of object images in image database 202. Other modules which may be local to device 106 or remote in the cloud, such as object determination module 222 and/or object comparison module 224, can access the images stored in image database 202 to perform various comparison operations. In some cases, image database module 218 can transfer selected images of database 202 to storage 208 to facilitate local processing. In a more general sense, image database module 218 allows for the availability of pre-classified images that can be used to help identify objects that are being imaged by device 106.

According to some embodiments, input module 220 is programmed or otherwise configured to receive inputs from computing device 106. One type of input that can be received by input module 220 includes, for example, a textual input provided by the user via text field 108 of GUI 214, or some other input mechanism of device 106 (e.g., a spoken input provided by the user via a microphone of device 106). Such input may describe, for example, the name and brand of the object for which the user is looking (e.g., Welch's grape jelly), and possibly the packaging of that object (e.g., can, jar, bottle, etc.). Once the user initiates a search for that target object, another type of input that can be received by input module 220 includes a imagery of scene captured via camera 216 of device 106, which may include a live video stream or still image. Object locator system 116 uses various image processing techniques discussed in the proceeding modules to locate and graphically identify the target object within the captured scene, according to some embodiments.

According to some embodiments, object determination module 222 is programmed or otherwise configured to identify the presence of various objects within the captured scene generated via camera 216. Object identification is performed by feeding the captured scene to a neural network trained to identify and categorize various objects. According to some embodiments, the neural network is trained using many (e.g., hundreds or thousands, or more) images of particular products offered for sale at a particular store where the user would be looking for one of the products. For example, a grocery store may train a neural network using hundreds or thousands of images of food products sold in that grocery store to identify any one of the store's products. In another example, an electronics store may train a neural network using hundreds or thousands of images of the various electronic or office products sold in that store to identify any one of the store's products. According to some embodiments, the neural network produces a bounding box output around each identified object within the received captured scene along with a confidence score for that bounding box and a one or more classification labels. The classification labels may be, for example, in the form of a vector that includes one or more classification labels for a given identified object to be used for categorizing the identified object. Such a vector is referred to herein as a label vector. For example, the label vector for a jar Welch's grape jelly may include the classification labels "Welch's", "grape", "jelly", "jar" based on what is identified by the neural network.

In the example embodiments shown, these classification labels are used by the object comparison module 224 to compare the given identified object detected in the imaged scene to corresponding images from image database 202 that have the same (or similar) classification labels, in effort to find a suitable match. Note that a perfect match of classification terms is not necessarily needed; rather, a sufficient match may be acceptable as well, such as the case where more than 50% of the classification terms associated with one object match the classification terms associated with another object. In any case, and according to some embodiments, object comparison module 224 is programmed or otherwise configured to compare certain features of one or more of the identified objects to images of the target object. In this example embodiment, object comparison module 224 also compares textual information found on one or more of the identified objects to the name of the target object provided by the user. Thus, and according to some example embodiments, object comparison module 224 has two sub-modules that can execute simultaneously in parallel or in a serial fashion. In particular, a first sub-module operates to compare object features and looks for a match with one or more images of the target object, and a second sub-module operates to compare textual information and looks for a match with the name of the target object.

According to some embodiments, the first sub-module runs through each of the identified objects in the captured scene and uses a feature detection technique (such as ORB) to identify salient features in each identified object of the imaged scene. These salient features are compared against salient features identified in the images of the target object from image database 202 (which may also be identified using the same ORB technique). According to some embodiments, the feature comparison uses a modified K-nearest neighbors routine that inversely compares the images and performs ratio testing to find a robust match. For example, a robust match may be found if at least 80% of the features between the compared images match. Further details of how the first sub-module of the object comparison module 224 is configured to compare features between identified objects of the imaged scene and the target object of reference images from database 202 are provided herein with reference to FIG. 7.

According to some embodiments, the second sub-module runs through each of the identified objects in the captured scene and uses a text identification technique, such as optical character recognition (OCR), to read text off of each identified object and compare it with the name of the target object provided by the user. One example such technique uses adaptive OCR technique, which includes accurately fixing live video stream frames as per the content geometry, and then running OCR to extract textual content from the fixed video frames. Any identified objects with matching text can be flagged as being likely matches for the target object. In some embodiments, textual information received from an identified object can be cross-verified using a localized dictionary or a stored catalog of object names (pertinent to the given store) to enhance the accuracy. Further details of how the second sub-module of the object comparison module 224 is configured to identify and compare textual information from the identified objects are provided herein with reference to FIG. 8.

According to some embodiments, display module 226 is programmed or otherwise configured to use augmented reality to show the location of the target object, by graphically identifying the location of the target object on display 204 of computing device 106, or on a screen that is networked with computing device 106 (such as AR glasses). For example, the captured video scene displayed on display 204 may show real-world items such as a shelving unit with multiple objects with one of the real-world objects being highlighted or otherwise indicated via a digital augmentation on the displayed scene (e.g., graying out of non-target objects, or highlighting the target object itself). The highlighting may involve, for example, a color filter or outline placed around the target object, while other examples include a mask filter around all other portions of the screen except for the location of the target object. In some embodiments, this visual highlighting of the object can be supplemented with additional feedback to help the user identify when the target product/object is being imaged, such as a haptic response (e.g., vibration of smartphone) or a beeping (e.g., via speaker of smartphone). Thus, the AR-based feedback provided to the user by display module 226 may include any combination of visual, tactile, or aural indicators.

As will be appreciated in light of this disclosure, the various functional components/modules such as image database module 218, input module 220, object determination module 222, object comparison module 224, display module 226, and GUI 214, may be implemented in software, such as a set of instructions (e.g., C, C++, object-oriented C, BASIC, etc.) encoded on any machine-readable medium or computer program product, that when executed by one or more processors, cause the various methodologies provided herein to be carried out. Various components of this example embodiment, including computing device 106, can be integrated into, for example, one or more desktop or laptop computers, workstations, tablets, smart phones, game consoles, AR devices or systems, set-top boxes, or other such computing devices. Other componentry and modules typical of a computing system, will be apparent. In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described herein. In a more general sense, any suitable combination of hardware, software, and firmware can be used, as will be apparent.

Figure 3:
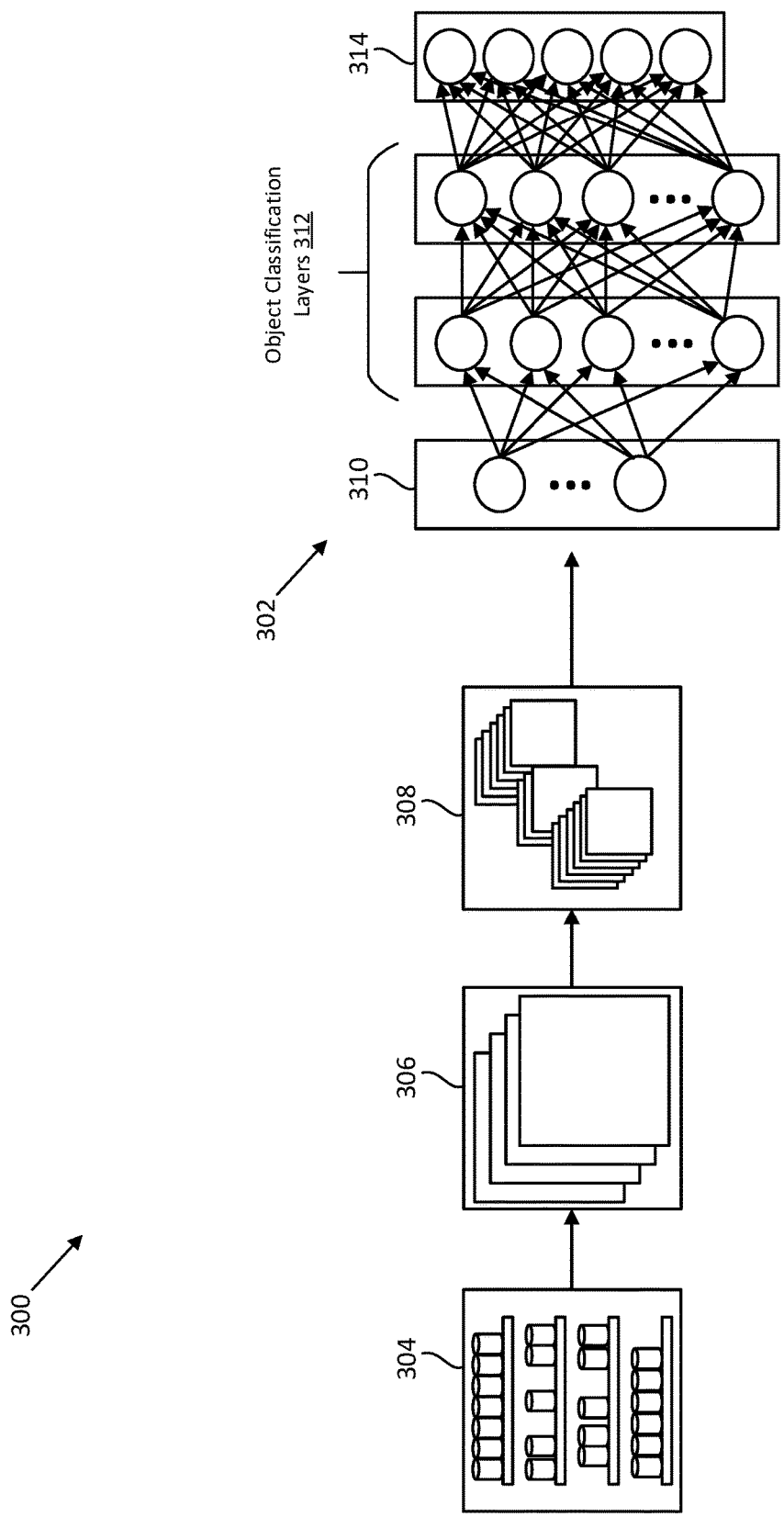
FIG. 3 illustrates an example object detection system that is a component of the object locator system of FIGS. 1 and 2, in accordance with an embodiment of the present disclosure.

FIG. 3 illustrates an object detection system 300, according to an embodiment. Specifically, object detection system 300 uses a neural network 302 to identify the locations of different objects within an input image 304. In some such embodiments, object detection system 300 is a component of object determination module 222 of FIG. 2.

Input image 304 represents any received image having more than one identifiable object present in the image, according to some embodiments. As noted above, the image may be, for example, a frame from a live video or a still image that is captured using any camera device, such as a smartphone camera.

One or more filters are applied to input image 304 by one or more convolutional layers 306, according to some embodiments. More specifically, one or more convolutional layers 306 break down input image 304 into various filtered feature maps that identify locations and relative strengths of detected features in the image. The same filter can be systematically applied across different sections of input image 304, which allows for the detection of salient image features regardless of their location in input image 304. In this application, the salient image features are those associated with the shape and size of the different objects in the image. As previously explained, the objects can be, for example, products being sold at a given store, or products within the food pantry or storage of a user.

According to some embodiments, pooling layers 308 are used to further down sample the detected features from the feature maps generated by one or more convolutional layers 306. In essence, pooling layers 308 operate on the individual feature maps to generate smaller pooled feature maps. The pooled feature maps summarize the feature data from the feature maps. According to some embodiments, the resulting pooled feature maps are more robust to any changes in position of the salient features from input image 304.

Once the feature maps or pooled feature maps have been generated from input image 304, the feature map data is fed as input to neural network 302. Neural network 302 includes an input layer 310, one or more object classification layers 312, and an output layer 314. Each of the layers of neural network 302 include neurons that represent mathematical functions and/or weights applied to data received as input to the neuron. The output of a neuron of one layer is received by each of the neurons in the proceeding layer. Accordingly, input layer 310 of neural network 302 can include any number of neurons that receive the image feature data from the pooled feature maps.

According to some embodiments, object classification layers 312 are configured during training of neural network 302 to identify object classifications based on the object features encapsulated in the pooled feature maps. The number of object classification layers 312, the number of neurons in each of the layers, and the function performed by each neuron are established during supervised training as neural network 302 learns how to distinguish between different objects. Accordingly, the characteristics (e.g., number of layers, number of neurons in a given layer, etc.) of object classification layers 312 can be different depending on various training factors. According to some embodiments, output layer 314 includes a number of neurons that correspond to the possible object classifications for each identified object in image 304. In the context of grocery store products, for instance, the possible object classifications might include, for example, food jar, food can, food box, food bottle, food bag, and food produce, to name a few examples.

Methodology

Figure 4:
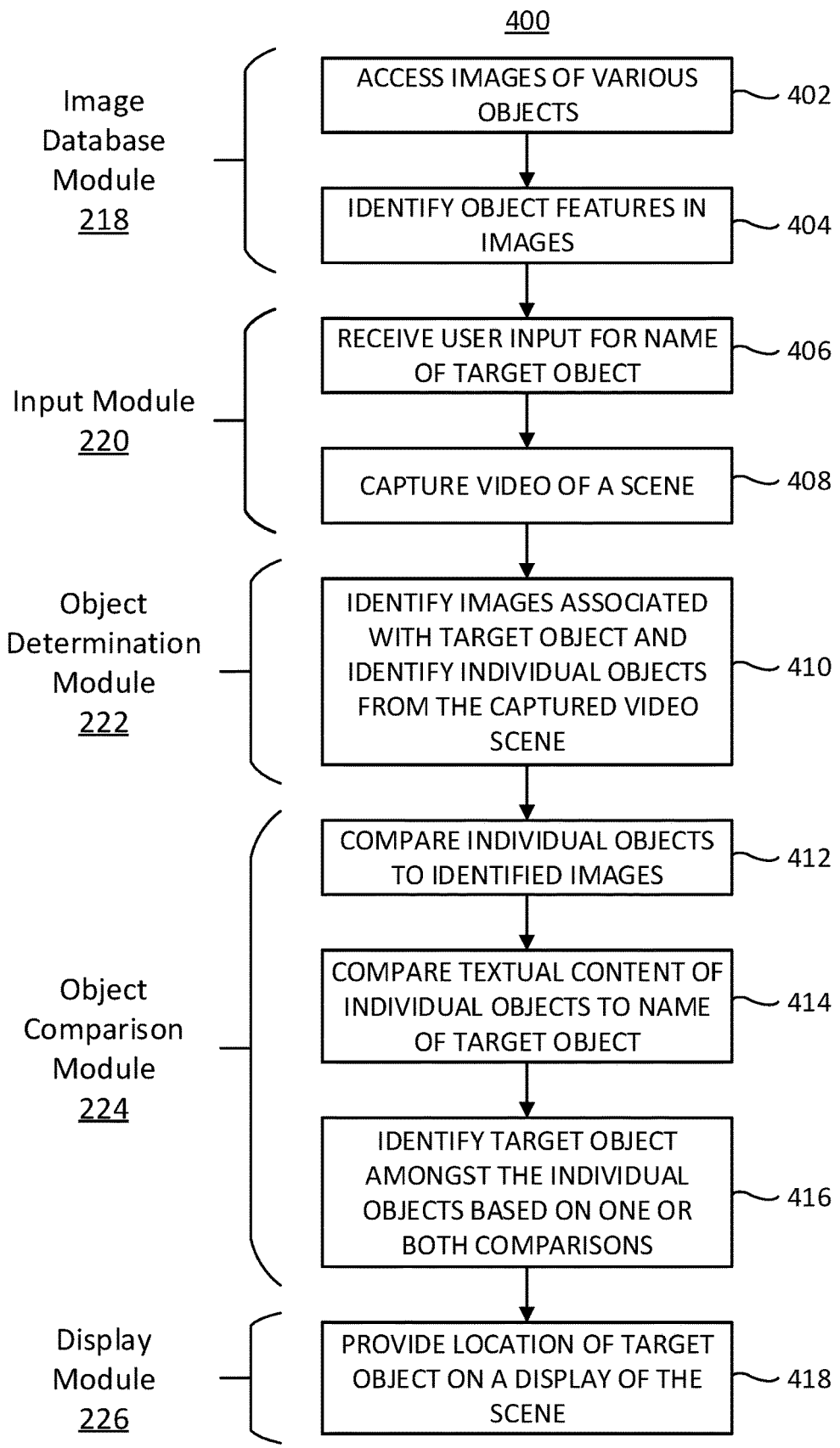
FIG. 4 is a flow diagram of an overall method carried out by the object locator system of FIGS. 1 and 2, in accordance with an embodiment of the present disclosure.

FIG. 4 is a flow diagram of an overall method 400 for locating a desired object among other objects, in accordance with an embodiment of the present disclosure. As discussed above, the video or other imagery may be captured by a user within a store looking for a particular product on the shelves of that store, according to some example embodiments. The operations, functions, or actions described in the respective blocks of example method 400 may be stored as computer-executable instructions in a non-transitory computer-readable medium, such as a memory and/or a data storage of a computing system, although the method 400 can be implemented in hardware as well, as previously explained. In some embodiments, the operations of the various blocks of method 400 are performed by object locator system 116. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

At block 402, images of various objects are accessed for further characterization. According to some embodiments, the operations of block 402 are performed by image database module 218. The images of various objects may be pre-stored images of objects found in given location. For example, a database of images may be created for a grocery store that includes images of different products sold in the store. In another example, a database of images may be created by a user that includes images of different products included in a user's pantry or storage area with that user's home. In any such cases, there may be more than one image associated with a given product. According to some embodiments, the accessed images are grouped or categorized based on what object they are associated with. So, for instance, all images for Welch's grape jelly can be grouped together, including all packaging designs (e.g., a first set of one or more images for jar or packaging design A, and a second set of one or more images for squeeze bottle or packaging design B).

At block 404, object features are identified within each of the accessed pre-stored images. According to some embodiments, the operations of block 404 are performed by image database module 218. According to some embodiments, an oriented FAST and rotated BRIEF (ORB) feature detection technique is used for each image to identify salient features within the image. The ORB technique is especially useful for this task as it is both scale and rotation invariant when identifying features, which helps to identify similar features between two images even if the product is larger/smaller or at a different angle between the images. According to an embodiment, ORB outputs locations (such as X and Y coordinates) of particular features or feature areas that can be used to identify the object within the image and compare it with other images having the same object. For example, salient features of an image of a box of cereal may include the four corners of the cereal box and locations that identify a particular graphic printed on the box. More particular details of how the images from the database are stored and characterized are provided herein with reference to FIG. 5.

It should be noted that the operations performed in each of blocks 402 and 404 may be considered pre-processing operations that are performed by any computing device before any input is received by a user for a target object. In other words, these operations set up the database of images to be used by the proceeding operations of method 400.

At block 406, an input for the name of a target object is received from a user, via a user interface as previously explained. According to some embodiments, the operations of block 406 are performed by input module 220. The user can provide the input in any number of different ways. For instance, assuming the user is executing the method 400 on a mobile computing device such as a smartphone or AR device, the user can enter the target object via a user interface of that computing device. The name of the target object can be typed, spoken, or selected (via, for example, tapping a picture of the object shown on a touchscreen).

At block 408, a live video image is captured from in front of the user using, for example, their mobile computing device. According to some embodiments, the operations of block 408 are performed by input module 220 (e.g., using the camera of a smartphone or AR device). The live video image may be a single frame from captured video or any number of frames from the captured video. In any such cases, the captured live video image may be simultaneously displayed on a screen of the user's mobile computing device, which may be the display of the user's smartphone, or the display of AR glasses, goggles or helmet worn by the user.

At block 410, one or more images from the stored database of images that correspond to the target object are identified to use for later comparison operations. According to some embodiments, the operations of block 410 are performed by object determination module 222. Additionally, one or more distinct objects are identified within the captured video image. According to some embodiments, the captured video image is provided as an input to a neural network that outputs bounding box locations around each object in the image. In one example, a Faster R convolutional neural network (FAST R-CNN) model is trained using at least hundreds of different images having objects across many different categories or classes to train the model to identify the presence of such objects. In some embodiments, the neural network is trained to identify at least 800 different object classes and their corresponding shapes/sizes within an image. In some embodiments, the neural network also outputs a confidence score with each bounding box to provide a level of confidence for each identified object. In some embodiments, if the confidence score for a given bounding box is below some threshold value, then the object corresponding to the given bounding box may be pruned from being considered in any of the later operations of method 400. In some embodiments, the neural network also generates a label vector that includes one or more classification terms or labels for a given identified object to be used for categorizing the identified object. For example, the label vector for a brown wallet may include the classification labels "brown", "wallet", "purse", "bag" based on what is identified by the neural network. According to some embodiments, these labels are compared to similar labels associated with the target object to determine if there is a possible match before proceeding with any further comparison operations. More particular details of how objects are identified in the captured video image are provided herein with reference to FIG. 6.

At block 412, features of the individual objects identified in the captured scene are compared to the features from the one or more images from the stored database of images that correspond to the target object. According to some embodiments, the operations of block 412 are performed by object comparison module 224. Feature detection of the individual objects identified in the captured scene may be carried out in the same way that feature detection was performed on the stored object images from block 404. For each identified object from the captured scene, the salient features of the identified object are compared to the salient features identified in the stored images associated with the target object. The feature comparison may use any known feature matching technique. According to some embodiments, a modified form of K nearest neighbors (KNN) matching is performed to ensure a highly robust match. Briefly, if attempting to find matching features between two images (image A and image B), K nearest neighbors matching is performed from image A to image B and also from image B to image A. Ratio testing can be performed on both matching operations (A to B and B to A) to ensure that features will match even if one image is taken at a different distance away from the object then the other image. Finally, symmetry matching is performed using at least 2 nearest neighbors to determine how many features between the two images are matching. According to some embodiments, the identified object is considered to be a robust match for the target object if a threshold percentage of features are found to match. The threshold percentage may be 65%, 70%, 75%, 80%, 85%, 90%, 95%, or 100%, depending on how sensitive the match is desired to be. More particular details of how the identified objects are compared to images of the objects to determine a match are provided herein with reference to FIG. 7.

At block 414, textual content of the identified objects within the captured scene is identified and compared to the name of the target object. According to some embodiments, the operations of block 414 are performed by object comparison module 224. The textual content may be captured using any known text identification technique, such as OCR. Additionally, the captured text can be enhanced using one or both of a dictionary or catalog of known object names. For example, when capturing a product sold in a grocery store, a catalog of product names from that store may be accessed and used to help correct any errors from the OCR process. Similarly, a dictionary may be accessed to correct simple errors in recognizing certain words from an identified object in the captured scene. The dictionary can be localized to the given application (e.g., a dictionary of grocery store products). The identified textual information from each of the identified objects is compared to the name of the target object (given by user) to determine if they match. Any matching objects can be flagged as being a potential match for the target object. More particular details of how textual information is identified and compared to the name of the target object are provided herein with reference to FIG. 8.

At block 416, a determination is made as to whether one of the identified objects from the captured scene is a match for the target object, based on one or both comparisons made in blocks 412 and 414. According to some embodiments, the operations of block 416 are performed by object comparison module 224. In some examples, an identified object from the captured scene is only considered to be a match for the target object if it is found to match a predetermined number of features in block 412 and it is found to have text that matches the name of the target object. In some other examples, an identified object can be considered a match if it matches at least some of the features in block 412 and it is found to have text that matches the name of the target object. More particular details of how one of the identified objects from the captured scene is determined to be the target object are provided herein with reference to FIG. 9.

At block 418, the location of the identified target object is provided on a screen that shows the live video image of the captured scene (e.g., augmented reality). In some other examples, the identified target object is graphically indicated on a still image taken from the captured video of the scene. According to some embodiments, the operations of block 418 are performed by display module 226. The target object within the scene can be identified or otherwise accentuated via any number of ways. For example, the captured video scene displayed on the screen may show multiple real-world objects with one of the real-world objects being the target object that is highlighted or emphasized in some way. The highlighting may involve a color filter or outline placed around the target object, while other examples include a mask filter placed around all other portions of the screen except for the location of the target object. Thus, the target object itself can be highlighted, or the non-target objects can be deemphasized or otherwise diminished in appearance; either way, the target object is accentuated in the user's augmented reality display. As will be appreciated, any graphical flourishes or notations (more generally, augmentations) to indicate the presence of the target object from amongst the other objects on the screen may be used.

Figure 5:
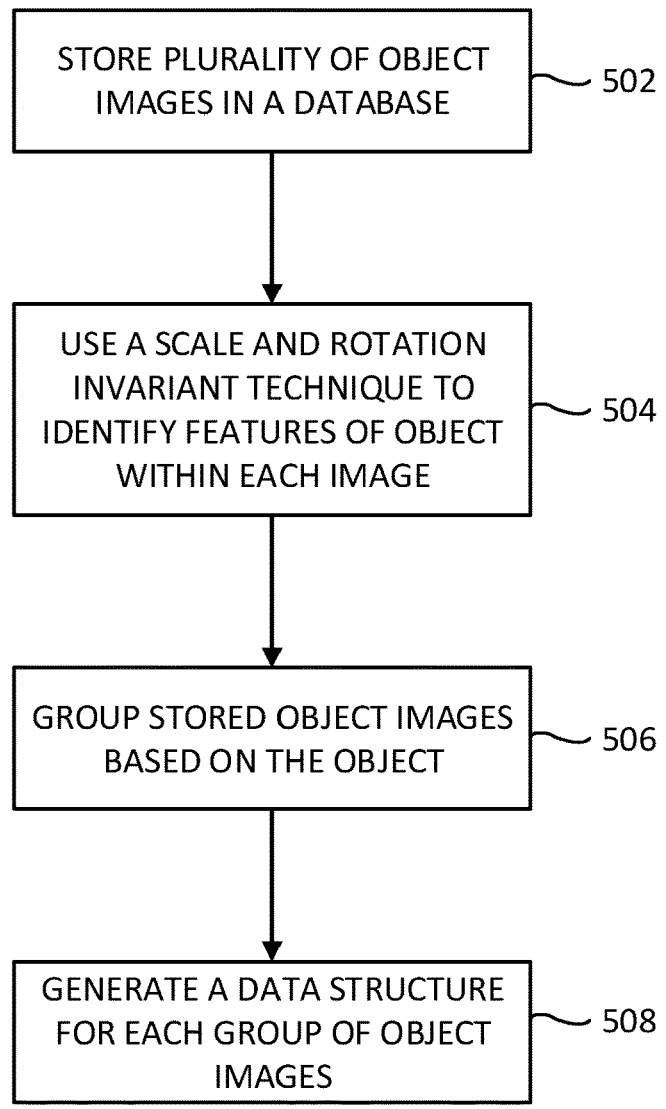
FIG. 5 is a flow diagram of a sub-process of the overall process of FIG. 4, for identifying object features for object images in a database, in accordance with an embodiment of the present disclosure.

FIG. 5 illustrates an example method 500, which further elaborates on operations of blocks 402 and 404 from method 400, according to an embodiment. The operations, functions, or actions described in the respective blocks of example method 500 may be stored as computer-executable instructions in a non-transitory computer-readable medium, such as a memory and/or a data storage of a computing system, although the method 500 can be implemented in hardware as well, as previously explained. As will be further appreciated in light of this disclosure, for this and other processes and methods disclosed herein, the functions performed in method 500 may be implemented in a differing order. Additionally, or alternatively, two or more operations may be performed at the same time or otherwise in an overlapping contemporaneous fashion. According to some embodiments, the functions performed in method 500 are executed by image database module 218.

Method 500 begins with block 502 where a plurality of images are stored in a database. Each image is a picture of an object that can be searched for by a user. According to some embodiments, the database includes objects that would be found together in a particular location. For example, a grocery store would have an image database that includes images of all of the products sold in the grocery store. For another example, a user's home pantry could have an image database that includes images of all of the products stored in that pantry. Any number of images may be provided for a given product and any number of total images may be stored. As noted above, the database of stored images may be provided in some network storage location, such as a webserver or local server system accessible via a local wireless network, or a remote or local storage accessible to the user's computing device. According to some embodiments, each of the images stored in the database also includes one or more classification labels corresponding to the object in each image. For example, a jar of strawberry jam may include classification labels such as "jar" and "red" to provide some descriptive categorization to the object. According to some embodiments, these classification labels can be used during comparison operations to readily determine if certain other objects captured from a live video image are a possible match for a target object having its own classification labels.

Method 500 continues with block 504 where a scale and rotation invariant technique is used to identify salient features of the object in each of the stored images. Using a scale and rotation invariant technique is useful for identifying image features and comparing to other image features regardless of how close the object features are in the image or the angle orientation of the object in the image. There are many types of scale and rotation invariant techniques for feature detection that can be used. One example technique is oriented FAST and rotation BRIEF (ORB). According to some embodiments, ORB is used to identify locations (e.g., X and Y coordinates in the images) of particular distinguishing features of the object in each image as well as corresponding feature values to identify characteristics of the image pixels at the feature location such as contrast or RGB values of the pixels. In some such example embodiments, the feature values are provided in a vector of different values corresponding to different color levels, contrast values, transparency values, etc.

At block 506, images in the database are grouped together by object. In other words, each object can include any number of images of that object. This may be done to ensure that multiple different angles of a given object are provided, and/or to consider different packaging for the object. For example, a particular box of cereal may have two different packaging designs provided in a store. Accordingly, a group of images for the box of cereal may include a first set of images that include different angles of the first packaging design and a second set of images that include different angles of the second packaging design. In another example, a particular type of soup may come in either relatively small cans or relatively large boxes. In such a case, a group of images for the particular type of soup may include a first set of images that include different angles of the can version of the soup and a second set of images that include different angles of the box version of the soup.

At block 508, a data structure is generated for each object to organize the various images associated with the object and the salient features of the object within each image. The data structure may include multiple fields having certain values to track different parameters associated with a given group of images. An example data structure for a given object is provided below.

```
Struct
{
    String    product-ID;
    Int       unique-representations;
    Blob      image-representations [N];
    Map       <feature-location, feature-vector> [N];
}
```

In this data structure, and in accordance with some embodiments, product-ID is a string value that provides the name of the object, unique-representations is an integer value that represents the total number (N) of images associated with the object, image-representations includes the raw image data for each of the N images, and a Map field is included to provide a list of all feature locations with corresponding feature vectors for each of the N images.

Figure 6:
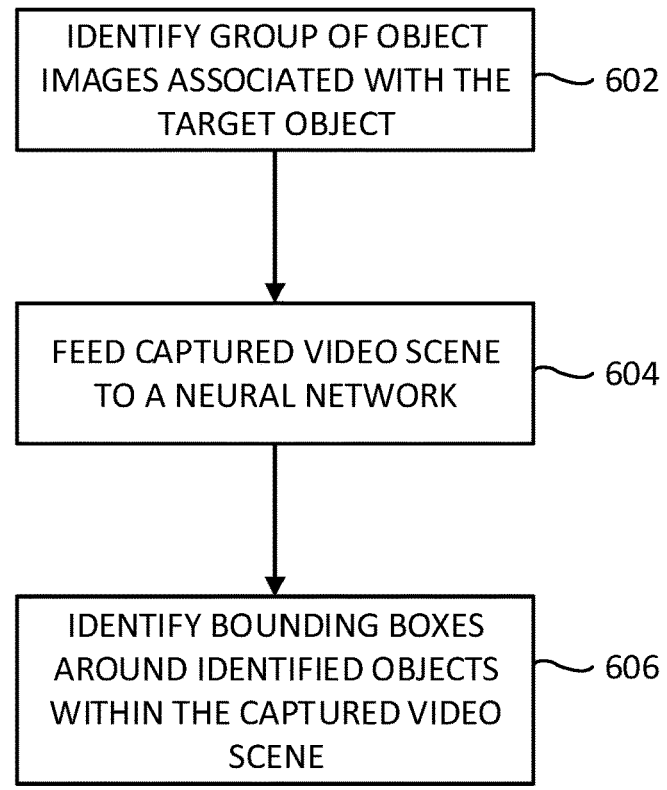
FIG. 6 is a flow diagram of a sub-process of the overall process of FIG. 4, for identifying different objects within the displayed video scene, in accordance with an embodiment of the present disclosure.

FIG. 6 illustrates an example method 600, which further elaborates on operations of block 410 from method 400, according to an embodiment. The operations, functions, or actions described in the respective blocks of example method 600 may be stored as computer-executable instructions in a non-transitory computer-readable medium, such as a memory and/or a data storage of a computing system, although the method 600 can be implemented in hardware as well, as previously explained. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion. According to some embodiments, the functions performed in method 600 are executed by object determination module 222.

Method 600 begins with block 602 where a group of the object images stored in the database that correspond to the target object are identified. The name of the target object inputted by the user may be matched with the data structure having the same product-ID to determine the images that are part of the data structure. In some embodiments, any text matching technique is performed to find the data structure having a product-ID that most closely matches with the name of the target object inputted by the user. According to some embodiments, later comparison operations compare the identified objects from the captured live video image to only the group of images associated with the target object as opposed to all images stored in the image database.

At block 604, the captured live video image of a scene in front of the user is fed to a neural network. As discussed above, the captured live video image may be a single frame (or multiple frames) from the captured video, or it may be a one-shot image. The live video image is fed as an input to a convolutional neural network, or any other type of deep neural network trained for object classification, in order to identify the locations of various objects within the live video image. In some embodiments, the video is still being captured (e.g., streaming) while one or more frames from the video are fed to the neural network.

At block 606, bounding box locations around each identified object from the input live video image are created. In some embodiments, the neural network also generates a confidence score with each bounding box and a label vector that includes one or more object classifications. For example, the label vector for a brown wallet may include the classification labels "brown", "wallet", "purse", "bag" based on what is identified by the neural network. These classification labels may be compared to the classification labels associated with the target object to determine if there is a possible match before proceeding with any further comparison operations. In some embodiments, a Faster R convolutional neural network (FAST R-CNN) model receives the live video image and outputs the bounding box locations, along with the confidence score and label vector for each of the bounding boxes. The FAST R-CNN can be trained using at least hundreds of different images having objects across many different categories or classes to train the model to identify the presence of such objects. In some embodiments, the neural network is trained to identify at least 800 different object classes and their corresponding shapes/sizes within an image. In some embodiments, if the confidence score for a given bounding box is below some threshold value, then the object corresponding to the given bounding box may be pruned from being considered in any future comparison operations.

Figure 7:
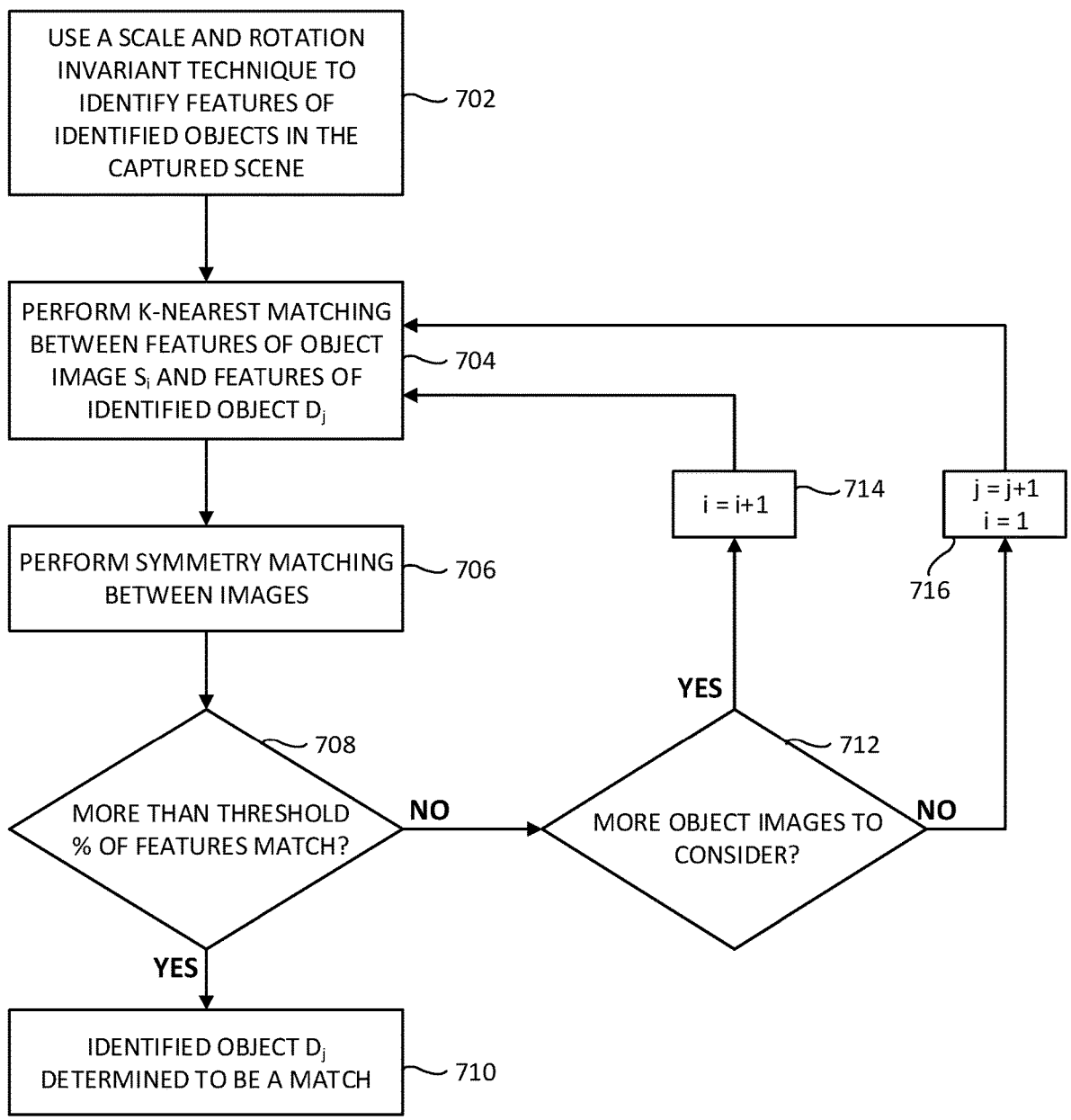
FIG. 7 is a flow diagram of a sub-process of the overall process of FIG. 4, for comparing object features from the displayed video scene to object features from the object images in the database, in accordance with an embodiment of the present disclosure.

FIG. 7 illustrates an example method 700, which further elaborates on operations of block 412 from method 400, according to an embodiment. The operations, functions, or actions described in the respective blocks of example method 700 may be stored as computer-executable instructions in a non-transitory computer-readable medium, such as a memory and/or a data storage of a computing system, although the method 700 can be implemented in hardware as well, as previously explained. As will be further appreciated in light of this disclosure, for this and other processes and methods disclosed herein, the functions performed in method 700 may be implemented in a differing order. Additionally, or alternatively, two or more operations may be performed at the same time or otherwise in an overlapping contemporaneous fashion. According to some embodiments, the functions performed in method 700 are executed by object comparison module 224.

Method 700 beings with block 702 where a scale and rotation invariant feature detection technique is used to identify salient features for individual objects from the captured scene. There are many types of scale and rotation invariant techniques for feature detection that can be used. According to some embodiments, ORB is used to identify locations (e.g., X and Y coordinates in the images) of particular distinguishing features of the object in each image as well as corresponding feature values to identify characteristics of the image pixels at the feature location such as contrast or RGB values of the pixels. In some embodiments, the feature values are provided in a vector of different values corresponding to different color levels, contrast values, transparency values, etc.

According to some embodiments, features are determined for each and every identified object within the captured scene. In such embodiments, the label vector associated with a given identified object is used to determine which object images from the database are to be used for subsequent matching operations. In other words, only those object images in the database having at least some matching classification labels with those from the label vector associated with the given identified object are used during the feature matching operations. This avoids having to compare the features of each identified object to features in each and every image of the object database. In some other embodiments, features are determined for only those identified objects having one or more classification labels that match to classification labels associated with the target object. In this way, image analysis is not needed for those objects that are clearly different from the target object. For example, if the target object to be found is "grape jelly", it may have a label vector that includes classification labels such as "jar", "purple", "jelly" to characterize how the object looks. An identified object from the captured scene may be a box of a certain brand of cereal having a label vector that includes classification labels such as "box" and "cereal" determined by the neural network. Since these classification labels do not match any of the classification labels of the target object, there is no need to determine features of the box of cereal and compare it to images of the target object.

At block 704, a matching operation is performed between the features of the identified objects in the captured scene and the features of the stored images associated with the target object. According to some embodiments, features of all identified objects in the scene are compared to the target object images, while in other embodiments features of only those identified objects with one or more matching classification labels to the target object are used in the comparison. According to some embodiments, a K-nearest matching technique is used between the features of a given object image $S_i$ and a given identified object $D_j$, where S represents that total number of images associated with the target object and D represents the total number of identified objects to be compared with the target object images. For any given identified object $D_j$, its features are compared against the features of all images associated with the object (e.g., all of S) before moving on to the next identified object $D_{j+1}$.

According to some embodiments, the K nearest matching technique is performed twice in an inverse manner to determine feature matches between the objects. Accordingly, a first matching operation is performed between $S_i$ and $D_j$ while a second matching operation is performed between $D_j$ and $S_i$. According to some embodiments, both matching operations are performed for each super-pixel or block of pixels that have at least two neighboring features. The neighboring features are other features in the image that are not the specific salient feature, but are close to it in a particular arrangement and can be matched to similar neighboring features of another image to increase the matching accuracy. An example of neighboring features includes features on a face, where the corner of the lips may be identified as a salient feature and neighboring features may be the chin and nose. Another example of neighboring features includes features on a jar, where the upper corner or curve of the jar may be identified as a salient feature and neighboring features may be the metal cap (just above the corner/curve of the jar) and a straight side (just below that corner/curve of the jar). A ratio test may be performed for each of the matching operations to check that the distance ratios between different features are the same between compared objects. The ratio test may be used to ensure that the zoom distance between the camera and the object does not affect the ability to match with another object at a different zoom distance.

At block 706, symmetry matching is performed between identified features of object image $S_i$ and identified object $D_j$ to ensure that the features are a robust match. According to some embodiments, symmetry matching uses the nearest neighbors identified from the K nearest matching technique to compare distances and orientations between the salient feature and its nearest neighbors of object image $S_i$ to the distances and orientations between the salient feature and its nearest neighbors of identified object $D_j$.

At block 708, a determination is made as to whether enough of the features of identified object $D_j$ match with the features of object image $S_i$. According to some embodiments, the identified object $D_j$ is considered to be a robust match for the target object if a threshold percentage of features are found to match. The threshold percentage may be 65%, 70%, 75%, 80%, 85%, 90%, 95%, or 100%, depending on how sensitive the match is desired to be. In some embodiments, features of a given image are represented by a feature vector which can be compared to a feature vector of another image. For example, a first feature vector of identified object Dj is compared to a second feature vector of target object image Si and a match is identified if the Euclidian distance between the first and second vectors is above a confidence threshold. If a high enough percentage of features are found to match, then identified object $D_j$ is flagged as being a match at block 710. If, on the other hand, there are not enough features determined to be a match, then method 700 proceeds to block 712.

At block 712, a determination is made as to whether there are more images of the target object S to consider. If there are more images in S to consider for the given identified object $D_j$, then method 700 proceeds to block 714 where i is increased by 1, and the method 700 proceeds back to block 704 to attempt matching features with another one of the stored images of the target object. On the other hand, if there are no more images in S to consider, then all possible images of the target object have been compared against $D_j$ and $D_j$ is not a match for the target object. In this situation, method 700 proceeds to block 716 where j is increased by 1 and i is reset back to 1 (or 0). Method 700 then proceeds back to block 704 to attempt matching features using a different identified object of the captured scene. At block 716, if all identified objects D have been compared to the object images S, then method 700 ends with either no matches found, or at least one identified object being flagged as a match to the target object.

Figure 8:
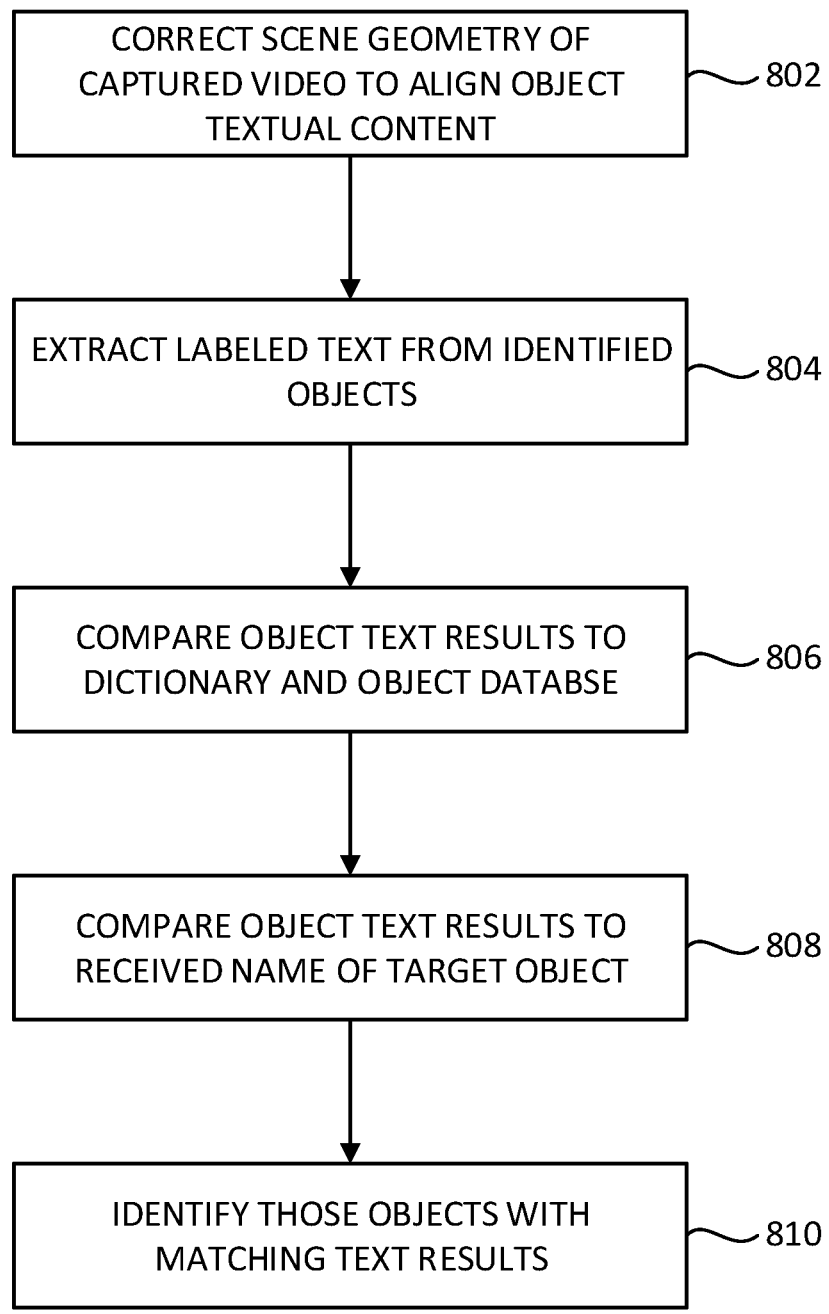
FIG. 8 is a flow diagram of a sub-process of the overall process of FIG. 4, for comparing textual content on the identified objects from the displayed video scene to the name of the target object, in accordance with an embodiment of the present disclosure.

FIG. 8 illustrates an example method 800, which further elaborates on operations of block 414 from method 400, according to an embodiment. The operations, functions, or actions described in the respective blocks of example method 800 may be stored as computer-executable instructions in a non-transitory computer-readable medium, such as a memory and/or a data storage of a computing system, although the method 800 can be implemented in hardware as well, as previously explained. As will be further appreciated in light of this disclosure, for this and other processes and methods disclosed herein, the functions performed in method 800 may be implemented in a differing order. Additionally, or alternatively, two or more operations may be performed at the same time or otherwise in an overlapping contemporaneous fashion. According to some embodiments, the functions performed in method 800 are executed by object comparison module 224.

Method 800 begins with block 802 where the geometry of the captured scene is corrected to align the text of the objects in a desired orientation. For example, the captured scene may be rotated to align any textual content on the one or more objects within the scene along the horizontal plane. Other image affects may be applied as well such as aberration correction to clean up the image and ensure that the textual content is clear or otherwise more accessible for subsequent processing.

At block 804, textual information typically in the form of product labels is extracted from each of the identified objects in the captured scene. Text extraction can be performed using any known text identification technique. One example technique is optical character recognition (OCR). In some embodiments, only text of a threshold size is extracted to avoid trying to extract large amounts of small text that may be present on certain objects and is unrelated to the name of the object.

At block 806, the extracted textual information is cross-verified and/or corrected using other text resources. For example, a dictionary localized to the given application (e.g., grocery store products) may be accessed to ensure that any extracted words are found in the dictionary. This may be used to correct textual translation errors if the word is close to one of the words in the dictionary (e.g., extracted text "finosaur" can be corrected to "dinosaur" using the dictionary). In another example, an object database or catalog of names of all the objects in a given location (or more generally, a database or catalog of objects commonly found in a given store type, whether grocery, electronics, wine/liquor, etc.) can be accessed to ensure that any extracted words are found in the object database or catalog. The object catalog can be used to correct textual translation errors similarly to the dictionary (e.g., extracted text "finosaur cookies" is corrected to "dinosaur cookies" after finding the product listed in the catalog).

At block 808, the extracted text from the identified objects in the captured scene is compared to the inputted name of the target object to determine if any of the identified objects are a match. In some embodiments, the extracted text is used from each and every identified object within the captured scene. In some other embodiments, the extracted text is used from only those identified objects having sufficiently matching label vectors where one or more classification labels match to one or more classification labels associated with the target object. In this way, textual comparison is not needed for those objects that are clearly different from the target object. A sufficient match in label vectors can vary from one embodiment to the next, but in some cases a sufficient match is determined when more than 50% of classification terms match for a given pair of label vectors, or more than 66% of classification terms match, or more than 85% of classification terms match, or more than 90% of classification terms match, or more than 95% of classification terms match. In some embodiments, the extracted text from a given identified object does not need to match exactly the name of the target object in order to be flagged as a match. For example, if at least a certain percentage of the extracted text matches the name of the target object, then the given identified object can still be flagged as a match.

At block 810, each of the identified objects in the captured scene having textual information that matches the name of the target object are flagged as being matches.

Figure 9:
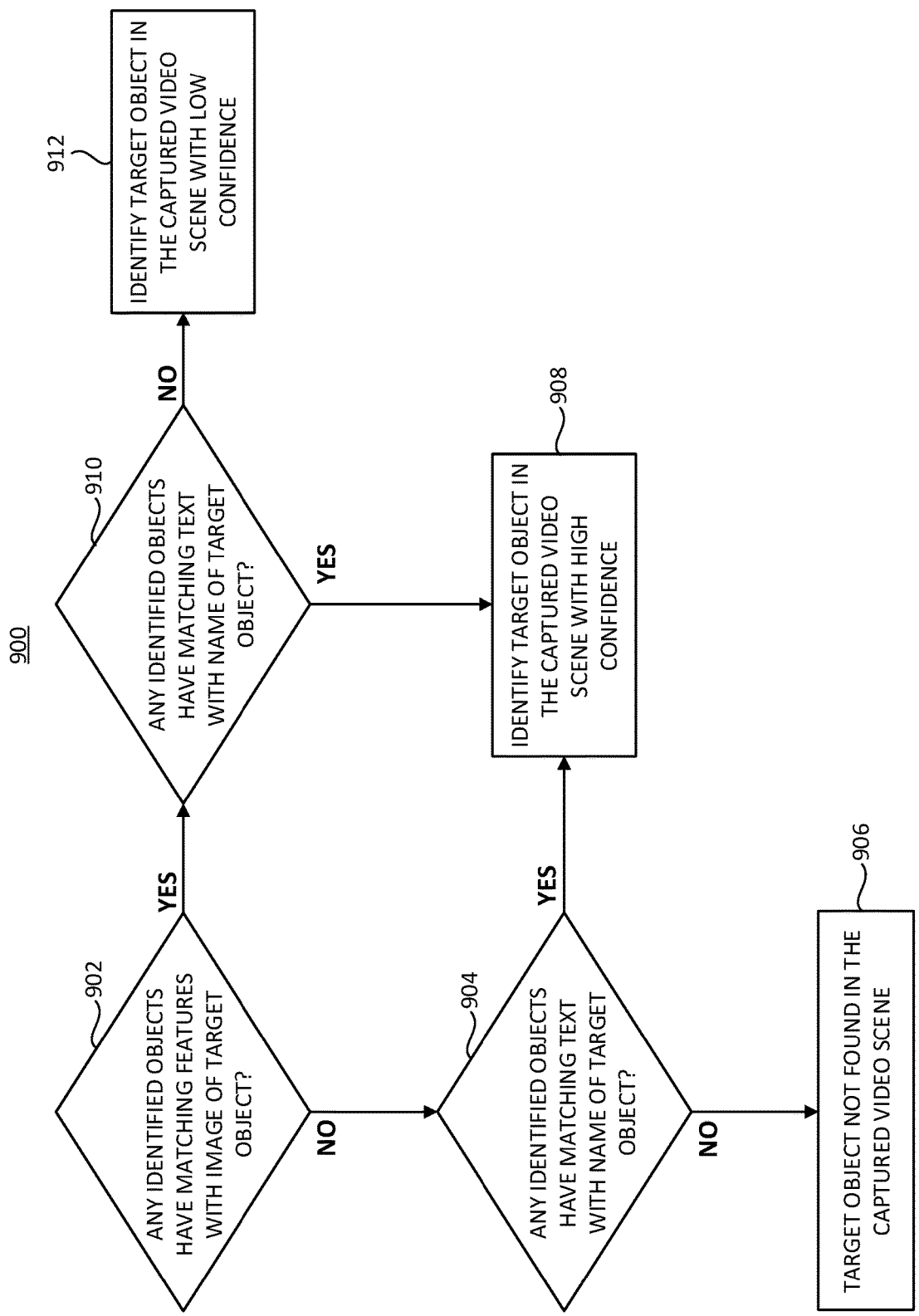
FIG. 9 is a flow diagram of a sub-process of the overall process of FIG. 4, for identifying the target object in the displayed video scene with a certain level of confidence, in accordance with an embodiment of the present disclosure.

FIG. 9 illustrates an example method 900, which further elaborates on operations of blocks 416 and 418 from method 400, according to an embodiment. The operations, functions, or actions described in the respective blocks of example method 900 may be stored as computer-executable instructions in a non-transitory computer-readable medium, such as a memory and/or a data storage of a computing system, although the method 900 can be implemented in hardware as well, as previously explained. As will be further appreciated in light of this disclosure, for this and other processes and methods disclosed herein, the functions performed in method 900 may be implemented in a differing order. Additionally, or alternatively, two or more operations may be performed at the same time or otherwise in an overlapping contemporaneous fashion. According to some embodiments, the functions performed in method 900 are executed by object comparison module 224 and display module 226. It should be understood that method 900 provides merely one example of how identified objects can be displayed as matches to the target object based on both comparison techniques Method 900 begins with block 902 where a determination is made as to whether there are any identified objects from the captured scene that were flagged as having matching features with at least one of the stored images of the target object. If there were any objects from the captured scene found to have matching features with the target object, then method 900 proceeds to block 910, otherwise, method 900 proceeds to block 904.

At block 904, another determination is made as to whether the textual content from any of the identified objects matches the name of the target object. If any of the identified objects has matching textual content, then method 900 proceeds to block 908 to graphically display the one or more identified objects that match the target object. Otherwise, method 900 proceeds to block 906 when none of the identified objects in the captured scene have matching features or matching text. At block 906, the target object is not found in the captured scene and an output can be provided to the user to indicate the same. Example outputs may include a message, graphic, or audible noise indicating that the target object is not found in the captured scene.

At block 908, one or more of the identified objects that match the target object are graphically identified in the captured scene. In some embodiments, augmented reality (AR) is used to show the location of the target object on a live video stream displayed on the screen. For example, the captured video scene displayed on the screen may show a shelving unit with multiple objects with the target object being highlighted. The highlighting may involve a color filter or outline placed around the target object, while other examples include a mask filter around all other portions of the screen except for the location of the target object. According to some embodiments, the target object may be considered to have been identified with high confidence if at least the textual information of the identified object in the captured scene matches the name of the target object.

At block 910, another determination is made as to whether the textual content from any of the identified objects matches the name of the target object. If any of the identified objects has matching textual content, then method 900 proceeds to block 908 to graphically display the one or more identified objects that match the target object. Otherwise, method 900 proceeds to block 912. At block 912, one or more of the identified objects that match the features of the target object, but not the text, are graphically identified in the captured scene. In some embodiments, augmented reality (AR) is used to show the location of the target object on a live video stream displayed on the screen. For example, the captured video scene displayed on the screen may show a real-world shelving unit with multiple real-world objects with the target object being graphically highlighted. The highlighting may involve, for example, a color filter or outline placed around the target object, while other examples include a mask filter around all other portions of the screen except for the location of the target object, as previously explained. According to some embodiments, the target object may be considered to have been identified with low confidence in the situation where the identified object matches features of the target object, but not the name of the target object. Recall that, as previously explained, the AR-based feedback may include tactile and/or aural indicators, in addition to such visual indicators.

As noted above in method 900, the target object may be graphically identified with high confidence (block 908) or low confidence (block 912). According to some embodiments, the graphical indication used may be different depending on whether it is made with high or low confidence, or a message may be displayed alerting the user that a given graphical indication has been made with low confidence.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Further Examples

Example 1 is method for locating a target object from a live video image, the method comprising: receiving, by an input module, an object name associated with the target object via a user interface; identifying, by an object determination module, one or more images associated with the target object from an image database; capturing, by the input module, video of a scene that includes a plurality of objects; identifying, by the object determination module, objects within the scene using a neural network having one or more object classification layers trained to detect the target object; comparing, by an object comparison module, the identified objects with any of the one or more images associated with the target object from the image database to determine if a match above a confidence threshold is found between any of the identified objects and any of the one or more images associated with the target object; comparing, by the object comparison module, textual content identified on the identified objects with the object name to determine if a match is found between the textual content on any of the identified objects and the object name; identifying, by the object comparison module, the target object from the identified objects, wherein the target object includes one or both of (1) a match above the confidence threshold with at least one of the one or more images associated with the target object or (2) textual content that matches the object name; and causing, by a display module, the target object to be highlighted on a display of the scene.

Example 2 includes the subject matter of Example 1, wherein the plurality of objects comprises products offered for sale in a physical store.

Example 3 includes the subject matter of Example 1 or 2, and further includes populating, by an image database module, the image database with a plurality of images of different objects, wherein the plurality of images includes a first group of one or more images associated with a first object and a second group of one or more images associated with a second object.

Example 4 includes the subject matter of Example 3, wherein each image in the image database is associated with a label vector comprising one or more classification labels for an object in that image.

Example 5 includes the subject matter of any of Examples 1 through 4, and further includes detecting features within each image of at least the one or more images associated with the target object.

Example 6 includes the subject matter of Example 5, wherein the features within a given image are detected using a feature detector, such as an oriented FAST and rotated BRIEF (ORB) feature detector.

Example 7 includes the subject matter of Example 5 or 6, wherein comparing the identified objects with any of the one or more images associated with the target object comprises: comparing, using a K nearest neighbors (KNN) methodology, the features of the one or more images associated with the target object with features identified in the one or more of the identified objects from the scene.

Example 8 includes the subject matter of any of Examples 5 through 7, wherein an identified object from the scene matches an image of the one or more images associated with the target object if at least 80% of the features from the identified object match the features from the image of the one or more images associated with the target object.

Example 9 includes the subject matter of any of Examples 5 through 8, wherein: the features within a given image are represented by a feature vector; an image of an identified object from the scene is represented by a first feature vector, and an image associated with the target object is represented by a second feature vector; and the image of the identified object matches the image of the target object if a Euclidian distance between the first and second vectors is above a confidence threshold.

Example 10 includes the subject matter of any of Examples 5 through 9, wherein K nearest neighbors (KNN) matching is performed based on each of (1) a comparison between the features of the one or more images associated with the target object to the features identified in the one or more of the identified objects from the scene, and (2) a comparison between the features identified in the one or more of the identified objects from the scene to the features of the one or more images associated with the target object.

Example 11 includes the subject matter of any of Examples 1 through 10, wherein identifying the objects within the scene comprises inputting a frame of the scene into the neural network that is trained to output bounding box locations around the identified objects, wherein each of the bounding box locations around a corresponding one of the identified objects includes an associated confidence score and a label vector, wherein the label vector comprises one or more classification labels associated with the identified object.

Example 12 includes the subject matter of any of Examples 1 through 11, wherein causing the target object to be highlighted on a display of the scene includes causing display of a mask that either masks out other objects of the displayed scene or masks out the target object of the displayed scene.

Example 13 is a system configured to locate a target object from a live video image, the system comprising: at least one processor; an input module, executable by the at least one processor, and configured to receive an object name associated with the target object via a user interface, and receive captured video of a scene that includes a plurality of objects; an object determination module, executable by the at least one processor, and configured to identify one or more images associated with the target object from an image database, identify objects within the scene using a neural network having one or more object classification layers, and identify textual content present on one or more of the identified objects; an object comparison module, executable by the at least one processor, and configured to compare the identified objects with any of the one or more images associated with the target object from the image database to determine if a match above a confidence threshold is found between any of the identified objects and any of the one or more images associated with the target object, and compare the textual content with the object name to determine if a match is found between the textual content on any of the identified objects and the object name, and identify the target object from the identified objects, wherein the target object includes one or both of a match above the confidence threshold with at least one of the one or more images associated with the target object or textual content that matches the object name; and a display module, executable by the at least one processor, and configured to cause a marking of the target object to appear on a display of the scene.

Example 14 includes the subject matter of Example 13, wherein the plurality of objects comprises grocery products.

Example 15 includes the subject matter of Example 13 or 14, and further includes an image database module, executable by the at least one processor, and configured to populate the image database with a plurality of images of different objects, wherein the plurality of images includes a first group of one or more images associated with a first object and a second group of one or more images associated with a second object, wherein each image in the image database is associated with a label vector comprising one or more classification labels for an object in that image.

Example 16 includes the subject matter of any of Examples 13 through 15, wherein the image database module is further configured to detect features within each image of at least the one or more images associated with the target object.

Example 17 includes the subject matter of Example 16, wherein the features within a given image are detected using an oriented FAST and rotated BRIEF (ORB) feature detector.

Example 18 includes the subject matter of Example 16 or 17, wherein the object comparison module is configured to compare, using a K nearest neighbors (KNN) methodology, the features of the one or more images associated with the target object with features identified in the one or more of the identified objects from the scene.

Example 19 includes the subject matter of any of Examples 16 through 18, wherein the image comparison module is configured to determine that an identified object from the captured video scene matches an image of the one or more images associated with the target object if at least 80% of the features from the identified object match the features from the image of the one or more images associated with the target object.

Example 20 includes the subject matter of any of Examples 16 through 9 wherein: the features within a given image are represented by a feature vector; an image of an identified object from the scene is represented by a first feature vector, and an image associated with the target object is represented by a second feature vector; and the object comparison module is configured to determine that the image of the identified object matches the image of the target object if a Euclidian distance between the first and second vectors is above a confidence threshold.

Example 21 includes the subject matter of any of Examples 16 through 20, wherein the object comparison module is configured to perform K nearest neighbors (KNN) matching based on each of (1) a comparison between the features of the one or more images associated with the target object to the features identified in the one or more of the identified objects from the scene, and (2) a comparison between the features identified in the one or more of the identified objects from the scene to the features of the one or more images associated with the target object.

Example 22 includes the subject matter of any of Examples 13 through 21, wherein the object determination module is further configured to input a frame of the scene into the neural network that is trained to output bounding box locations around the identified objects.

Example 23 includes the subject matter of Example 22, wherein each of the bounding box locations around a corresponding one of the identified objects includes an associated confidence score and a label vector, wherein the label vector comprises one or more classification labels associated with the identified object.

Example 24 includes the subject matter of any of Examples 13 through 23, wherein the display module is configured to cause display of a mask that either masks out other objects of the displayed scene or masks out the target object of the displayed scene.

Example 25 is computer program product including one or more non-transitory machine-readable mediums having instructions encoded thereon that when executed by at least one processor cause a process to be carried out for locating a target object from a live video image, the process comprising: receiving an object name associated with the target object via a user interface; capturing video of a scene that includes a plurality of objects; identifying one or more images associated with the target object from an image database; identifying objects within the scene using a neural network having one or more object classification layers; identifying one or more salient features of the identified objects; identifying textual content present on the identified objects; identifying the target object from the identified objects, using the one or more salient features and/or the identified textual content; and causing the target object to be highlighted on a display of the scene.

Example 26 includes the subject matter of Example 25, wherein the plurality of objects comprises products of physical store.

Example 27 includes the subject matter of Example 25 or 26, wherein identifying the target object from the identified objects includes comparing one or more salient features of a reference image associated with the target object with one or more of the one or more salient features of the identified objects.

Example 28 includes the subject matter of any of Examples 25 through 27, the process further comprising: identifying an image associated with the target object, the image from an image database; identifying a salient feature within the image associated with the target object; and comparing the salient feature within the image with a salient feature of one or more of the identified objects, wherein identifying the target object from the identified objects is based on the comparing.

Example 29 includes the subject matter of Example 28, wherein the comparing uses a K nearest neighbors (KNN) methodology, in which KNN matching is performed based on each of (1) a comparison between the salient feature within the image associated with the target object to the salient feature of the one or more of the identified objects, and (2) a comparison between the salient feature of the one or more of the identified objects to the salient feature within the image associated with the target object.

Example 30 includes the subject matter of any of Examples 25 through 29, wherein identifying the objects within the scene comprises causing a frame of the scene to be input to the neural network, and wherein the neural network is trained to output bounding box locations around the identified objects, and wherein each of the bounding box locations around a corresponding one of the identified objects includes a label vector comprising one or more classification labels associated with the identified object.

Example 31 includes the subject matter of any of Examples 25 through 30, wherein causing the target object to be highlighted on a display of the scene includes causing display of other objects of the displayed scene to be diminished.

Example 32 is computer program product including one or more non-transitory machine-readable mediums having instructions encoded thereon that when executed by at least one processor cause a process to be carried out for locating a target object from a live video image, the process comprising the methodology of any of Examples 1 through 12.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for locating a target object in a scene, the method comprising:
   receiving an object name associated with a target object;
   capturing a scene that includes a plurality of candidate objects;
   identifying a plurality of candidate object images within the scene using a neural network having one or more object classification layers, each of the candidate object images corresponding to one of the plurality of candidate objects;
   identifying, in at least some of the identified candidate object images, corresponding candidate textual content;
   for each one of the at least some of the identified candidate object images, comparing the corresponding candidate textual content with the object name to determine if at least a partial textual match is found between the corresponding candidate textual content and the object name;
   identifying a particular candidate object image having the at least partial textual match with the object name; and
   causing the particular candidate object image to be highlighted on a display of the scene.

2. The method of claim 1, wherein:
   capturing the scene comprises capturing and displaying video of the scene using a touch screen display; and
   after the video of the scene is displayed, the display of the scene having the particular candidate object image highlighted is provided via the touch screen display.

3. The method of claim 1, wherein the one or more object classification layers are trained to detect the target object.

4. The method of claim 1, wherein:
   capturing the scene comprises capturing a video of the scene, the captured video comprising multiple frames; and
   the plurality of candidate object images are identified within a particular frame of the captured video.

5. The method of claim 1, further comprising comparing one or more of the identified candidate object images with a target object image of the target object to determine if an image match above a confidence threshold is found.

6. The method of claim 1, further comprising comparing one or more of the identified candidate object images with a target object image of the target object to determine if an image match above a confidence threshold is found, wherein the particular candidate object image also has the image match with the target object image.

7. The method of claim 1, further comprising identifying, in an image database, one or more target object images associated with the target object.

8. The method of claim 1, further comprising:
   identifying, in an image database, one or more target object images associated with the target object; and
   comparing one or more of the identified candidate object images with at least one of the target object images identified in the image database to determine if an image match above a confidence threshold is found.

9. A method for locating a target object in a scene, the method comprising:
   identifying a target object image;
   capturing a scene that includes a plurality of objects;
   identifying a plurality of candidate object images within the scene using a neural network having one or more object classification layers, each of the candidate object images corresponding to one of the plurality of objects;
   comparing at least some of the identified candidate object images with the target object image to determine if a match above a confidence threshold is found;
   identifying a particular candidate object image having the match above the confidence threshold with the target object image; and
   causing the particular candidate object image to be highlighted on a display of the scene.

10. The method of claim 9, wherein the one or more object classification layers are trained to detect a target object included in the target object image.

11. The method of claim 9, wherein:
    capturing the scene comprises capturing and displaying video of the scene using a touch screen display; and
    after the video of the scene is displayed, the display of the scene having the particular candidate object image highlighted is provided via the touch screen display.

12. The method of claim 9, wherein:
    capturing the scene comprises capturing video of the scene, the captured video comprising multiple frames; and
    the plurality of candidate object images are identified within a particular frame of the captured video.

13. The method of claim 9, further comprising receiving an object name associated with a target object via a user interface, wherein the target object image is identified by searching an image database for images tagged with the object name.

14. The method of claim 9, further comprising comparing textual content identified in at least one of the identified candidate object images with an object name associated with a target object in the target object image.

15. The method of claim 9, further comprising comparing textual content identified in at least one of the identified candidate object images with an object name associated with a target object in the target object image, wherein the particular candidate object image also includes textual content that at least partially matches the object name.

16. The method of claim 9, further comprising comparing textual content identified in at least one of the identified candidate object images with an object name received via a user interface.

17. A system configured to locate a target object in a scene, the system comprising:
- at least one processor;
- an object determination module that is executable by the at least one processor, and that is configured to
  - identify a target object image,
  - capture a scene that includes a plurality of objects, and
  - identify a plurality of candidate object images within the scene using a neural network having one or more object classification layers, each of the candidate object images corresponding to one of the plurality of objects;
- an object comparison module that is executable by the at least one processor, and that is configured to
  - compare at least some of the identified candidate object images with the target object image to determine if a match above a confidence threshold is found, and
  - identify a particular candidate object image having the match above the confidence threshold with the target object image; and
- a display module that is executable by the at least one processor, and that is configured to cause the particular candidate object image to be highlighted on a display of the scene.

18. The system of claim 17, wherein the object comparison module is further configured to compare textual content identified in at least one of the identified candidate object images with an object name associated with a target object in the target object image.

19. The system of claim 17, wherein the object comparison module is further configured to compare textual content identified in at least one of the identified candidate object images with an object name associated with a target object in the target object image, wherein the particular candidate object image also includes textual content that at least partially matches the object name.

20. The system of claim 17, further comprising an input module that is executable by the at least one processor, and that is configured to receive an object name associated with a target object via a user interface, wherein the target object image is identified by searching an image database for images tagged with the object name.

\* \* \* \* \*